US012762963B2

(12) United States Patent
Peram et al.

(10) Patent No.: US 12,762,963 B2
(45) Date of Patent: Oct. 13, 2026

(54) METHOD AND SYSTEM OF FLIGHT OPERATION ASSESSMENT USING PILOT FEEDBACK

(71) Applicant: HONEYWELL INTERNATIONAL INC., Charlotte, NC (US)

(72) Inventors: Jyothsna Peram, Bangalore (IN); Sai Keshav Gaba, Bangalore (IN)

(73) Assignee: Honeywell Aerospace US LLC, Phoenix, AZ (US)

( * ) Notice: Subject to any disclaimer, the term of this patent is extended or adjusted under 35 U.S.C. 154(b) by 51 days.

(21) Appl. No.: 18/966,709

(22) Filed: Dec. 3, 2024

(65) Prior Publication Data

US 2026/0112275 A1 Apr. 23, 2026

(30) Foreign Application Priority Data

Oct. 18, 2024 (IN) ............................ 202411079251

(51) Int. Cl.
*G08G 5/34* (2025.01)
*G08G 5/22* (2025.01)
*G08G 5/26* (2025.01)

(52) U.S. Cl.
CPC ................. *G08G 5/34* (2025.01); *G08G 5/22* (2025.01); *G08G 5/26* (2025.01)

(58) Field of Classification Search
CPC ............... G08G 5/34; G08G 5/22; G08G 5/26
See application file for complete search history.

(56) References Cited

U.S. PATENT DOCUMENTS

2013/0080043 A1* 3/2013 Ballin ...................... G08G 5/32 701/120
2024/0282201 A1* 8/2024 Bergstrom ............... G08G 5/53

FOREIGN PATENT DOCUMENTS

WO WO-2021092627 A1 * 5/2021 ............... G05D 1/46

* cited by examiner

*Primary Examiner* — Scott A Browne
*Assistant Examiner* — Jason Nguyen
(74) *Attorney, Agent, or Firm* — Ingrassia Fisher & Lorenz

(57) ABSTRACT

A method includes receiving, by at least one processor, vehicle data associated with at least one journey of a vehicle and indicating at least one implemented vehicle operation used to perform the at least one journey, and receiving, by at least one processor, a vehicle protocol arranged to be used to determine at least one protocol vehicle operation of the at least one journey. The method also includes automatically detecting, by at least one processor, one or more differences between the at least one implemented vehicle operation and the protocol vehicle operation. The differences are associated with the vehicle protocol and feedback information that explains the differences. The feedback information is obtained by using at least one feedback page with requests for the feedback information displayed on a display device. The feedback data is to be used to generate at least one modified vehicle protocol.

19 Claims, 10 Drawing Sheets

METHOD AND SYSTEM OF FLIGHT OPERATION ASSESSMENT USING PILOT FEEDBACK

CROSS REFERENCE TO RELATED APPLICATION

This application claims priority to India Provisional Patent Application No. 202411079251, filed Oct. 18, 2024, the entire content of which is incorporated by reference herein.

TECHNICAL FIELD

The subject matter described herein generally relates to vehicles, and more particularly, to vehicle operation assessment using feedback from the user of the vehicle.

BACKGROUND

During a flight of an aircraft, a pilot is expected to follow many different protocols or standard operating procedures (SOPs) including those provided to improve flight plans with certain priorities. Such priorities may include fuel efficiency, reduced hazardous emissions, safety protocols to avoid severe weather events, and so forth. To determine whether such flight plans achieve goals related to the vehicle or flight priorities, an aircraft is monitored to generate flight data that is then obtained from the aircraft. The flight, and in turn the aircrew, then are rated depending on reaching those goals. When the goals are not reached, this results in an inefficient flight. However, when the analysis of the obtained flight data does not explain the reasons the goals were not achieved, low pilot performance is assumed. These assumptions can lead to subsequent inefficient flight planning due to the lack of accurate knowledge as to the reasons priority goals were not met during previous flights. This is made worse when the transmission of flight data to the flight operations assessment system is delayed whether due to manual (paper hard copy) tasks or delays in the electronic systems used for such transmissions. Hence, a flight operation assessment system is desired that accurately and quickly assesses flight operations when an aircrew of a flight provides feedback information explaining the reasons for underperformance when flight plan priority goals were not met.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one implementation, a method includes receiving, by at least one processor, vehicle data associated with at least one journey of a vehicle and indicating at least one implemented vehicle operation used to perform the at least one journey, and receiving, by at least one processor, a vehicle protocol arranged to be used to determine at least one protocol vehicle operation of the at least one journey. The method also includes automatically detecting, by at least one processor, one or more differences between the at least one implemented vehicle operation and the protocol vehicle operation. The difference is associated with the vehicle protocol. The method also includes receiving, by at least one processor, feedback data explaining the one or more differences. The operation of receiving the feedback data comprises obtaining feedback information by using at least one feedback page with requests for the feedback information displayed on a display device. The method also includes generating at least one modified vehicle protocol comprising adding data of a situation associated with the feedback information to a set of available situations and available to the aircraft.

In another implementation, a display device includes at least one display screen to display at least feedback-related images, memory to store data related to at least one journey of at least one vehicle and associated with a user of the vehicle, and processor circuitry forming at least one first processor communicatively coupled to the memory and being arranged to operate by: displaying a set of journeys associated with the user on the display screen, and receiving a selection of at least one journey of the set of journeys. The first processor also is arranged to operate by displaying requests for feedback information on a feedback page on the display screen and associated with at least one vehicle protocol arranged to be used to determine protocol vehicle operations of the journey, and receiving the feedback information from the user by using the feedback page and transmitting the feedback information to at least one remote second processor that performs updating of vehicle protocols depending on the feedback information. The remote second processor is arranged to operate by: automatically detecting one or more differences between at least one implemented vehicle operation of the selected journey and at least one of the protocol vehicle operations associated with the selected journey, determining whether the feedback information explains the one or more differences, and using the feedback information to generate at least one modified vehicle protocol comprising automatically adding a situation associated with the feedback information to a set of available situations each with a different protocol vehicle operation.

In yet another implementation, a system includes memory, and processor circuitry forming at least one processor communicatively coupled to the memory, and being arranged to operate by: receiving vehicle data associated with at least one journey by a vehicle and indicating at least one implemented vehicle operation used to perform the at least one journey, and receiving a vehicle protocol arranged to be used to determine at least one protocol journey operation of the at least one journey. The processor also is arranged to operate by automatically detecting one or more differences between the at least one implemented vehicle operation and the protocol vehicle operation, and receiving feedback data explaining the one or more differences. The operation of receiving the feedback data comprises obtaining feedback information by using a feedback page with requests for the feedback information displayed to a user of the at least one journey and on a display device. The processor also is arranged to operate by automatically generating at least one modified vehicle protocol comprising automatically adding a vehicle situation associated with the feedback information to a list of available vehicle situations each with a variation of a protocol vehicle operation, and providing the modified vehicle protocol to be transmitted to at least one avionics system onboard at least one aircraft to be used to set at least one vehicle operation.

Furthermore, other desirable features and characteristics of the subject matter described herein will become apparent from the subsequent detailed description and the appended claims, taken in conjunction with the accompanying drawings and the preceding background.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
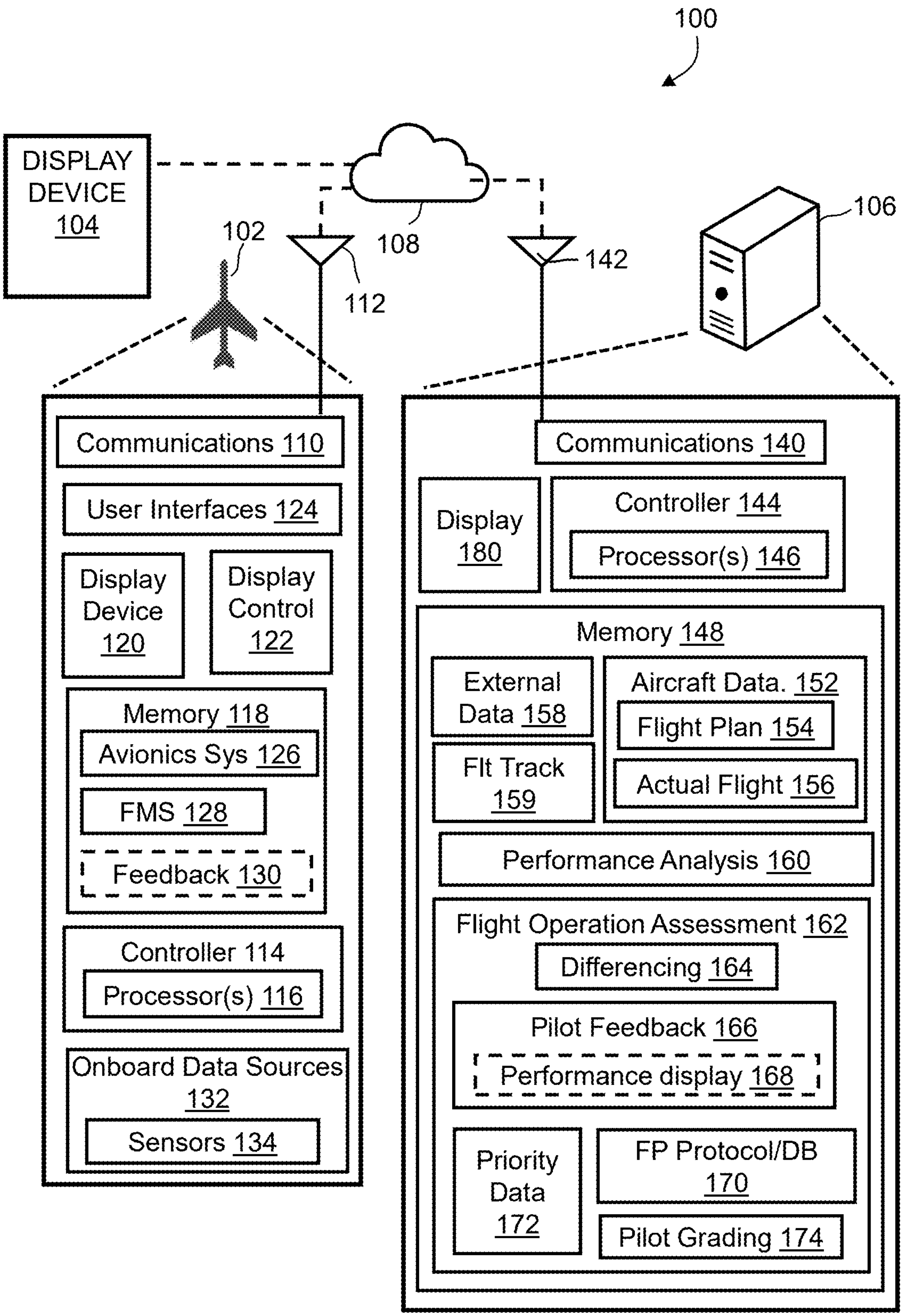
FIG. 1 is a schematic diagram of an example system to operate a method of flight operation assessment using pilot feedback according to at least one of the implementations described herein.

The following detailed description is merely exemplary in nature and is not intended to limit the subject matter of the application and uses thereof. Furthermore, there is no intention to be bound by any expressed or implied theory presented in the preceding technical field, background, brief summary, or the following detailed description.

Monitoring data of aircraft and flight information is collected from aircraft in order to improve the aircraft protocols, and in turn flight plans and other flight operations, for future flights. Some data is collected from the aircraft automatically by aircraft communications systems that collect flight performance data and aircraft state data such as engine status, operational conditions, air traffic control (ATC) data, and data of other metrics, while other entities or systems provide external data, such as weather, historical, and maintenance record data for an aircraft for example.

This monitoring data alone, however, does not always explain the complete situation of the operations on an aircraft. In some cases, an evaluation of the flight may reveal that flight plan priority goals were not achieved, but no appropriate explanation is available as to why the goals were not achieved, thereby often assuming pilot action or inaction was the cause. Thus, for example, a single engine fuel efficiency taxi protocol may have been expected for the taxiing of an aircraft to a runway, but could not be achieved due to aircraft traffic at an airport. In this case, the pilot has no way to provide an explanation. As a result, a flight assessment cannot accurately and realistically plan for such traffic to make improvements in fuel efficiency or other flight plan priority for future flight plans. Thus, such evaluation systems may use algorithms that cannot possibly provide realistic and practical flight plans for certain conditions. Also, the pilot may receive a lower rating or demerit when such assessments are used to grade the pilots for an airline company or other entity.

To attempt to correct this situation in some cases, pilot surveys and reports can be obtained post-flight. Such reports, however, can take 7-10 days to be received by a typical flight planning protocol base. This occurs because many of these reports are manually filled out paper forms, and/or are only available when a pilot flies into a certain location. Hence, a system is still desired that efficiently and timely obtains and uses pilot feedback to provide human input to improve flight operations for aircraft in a wide variety of flying conditions.

To resolve these issues, the disclosed system and method collects, provides, and analyzes pilot feedback that is used in flight operation assessment systems to update or revise aircraft protocols or SOPs, improve the accuracy of flight planning algorithms, and enable an aircrew or pilot to generate flight plans and perform flight operations that better achieve fight plan priorities (or aircraft protocols) for an aircraft, such as fuel efficiency as one example. Therefore, the flight assessment system described herein improves the technology of the aircraft itself by enabling generation of flight plans or flight operations that are more efficient, safer, less environmentally harmful, less costly, more time efficient, better at complying with regulations, and/or provide better features, comfort and/or safety for passengers or for carrying cargo, and so forth. The flight operation systems described herein can manually or automatically use pilot feedback (or feedback information) efficiently and quickly to modify flight protocols to make these improvements. It should be noted that the term 'pilot' herein collectively refers to any one or more aircrew members in control of, or on, an aircraft including co-pilots, and is not otherwise limited, and may be referred to herein as a user including of vehicles other than aircraft and by using a feedback display device described below.

The feedback information is obtained by having a pilot input feedback information into a feedback system on a display device whether a smartphone, tablet, an electronic flight bag (EFB), a display in an aircraft cockpit, or any other display device connected to a computer network. The feedback system on the display device has the ability to transmit the feedback information to a flight operations assessment unit or system. The transmission can be performed immediately or relatively quickly upon the pilot entering and confirming the input feedback information, thereby ideally reducing or eliminating lag time for use of the feedback information. This is accomplished by using a set of pilot feedback (PF) pages on the feedback system to receive the pilot feedback information and transmit the feedback information to a system operating the flight operation assessment unit.

Referring now to FIG. 1, an example system 100 is illustrated in accordance with the example implementations herein. The system 100 includes at least one aircraft 102 and at least one remote system 106 that may be at a ground airline or vehicle control or base, an airline flight operation (FlightOps) base, a dispatch team base, a maintenance base (or ground maintenance), and so forth. The system 100 also may include a feedback display device 104 that displays feedback pages of a feedback system as described herein, but also may display avionics system pages or images. The aircraft 102 may include any number and type of aircraft and is not particularly limited as long as the aircraft has the systems to be used with pilot feedback as described herein.

It will be appreciated, however, that while the present examples describe the method and system herein for an aircraft, the present methods and systems may be used for vehicles other than an aircraft, such as land craft including automobiles or trucks and so forth, watercraft, and space craft, etc., as long as the vehicle has systems that can benefit from pilot or driver (or user) feedback as disclosed herein. In these cases, a flight is merely one type of journey that can be assessed by the present methods and systems.

The aircraft 102 may include a controller 114 operationally coupled to computer-readable storage media or memory 118, onboard data sources 132 including, for example, an array of sensors 134, and a communications system 110 including an antenna 112, which may wirelessly transmit data to and receive data from various external sources physically and/or geographically remote to the aircraft 102 such as the remote system 106 and/or feedback (FB) display device 104. The aircraft 102 also may have one or more aircraft display devices 120, one or more display control units 122, one or more user interfaces 124 that use graphical user interfaces (GUIs) on the aircraft display device 120.

The memory 118 may hold or store a flight management system (FMS) 128, other avionics systems 126 described herein, and optionally a feedback unit or system 130 when it is desirable to provide the feed information on the aircraft 102 rather than a mobile feedback device 104.

The remote system 106 may include a controller 144 operationally coupled to a remote computer-readable storage media or memory 148, a communications system 140 including an antenna 142, which may wirelessly transmit data to and receive data from various external sources physically and/or geographically remote to the remote system 106, such as to receive monitored data from the aircraft and transmit updated flight protocols to the aircraft 102, or transmit flight identification data to the FB display device 104 or receive feedback information from FB display device 104 as described herein.

Although schematically illustrated in FIG. 1 as a single unit, the individual elements and components of the system 100 can be implemented in a distributed manner utilizing any practical number of physically distinct and operatively interconnected pieces of hardware or equipment.

The term "controller," as appearing herein, broadly encompasses those components used to perform or otherwise support the processing functionalities of the system 100. Accordingly, the controllers 114 and 144 can encompass or may be associated with circuitry forming any number of individual processors, computer-readable memories, power supplies, storage devices, interface cards, and other standardized or customized components.

In various implementations, each of the controllers 114 and 144 include processor circuitry forming at least one processor 116 and 146 respectively, a communication bus (not shown), and a computer readable storage device or media. The processors 116 and 146 performs the computation and control functions of the controller 114 or 144. The processors 116 and 146, and the controllers 114 and 144 may form or be part of an avionic server or gateway server. The processors 116 and 146 can be any custom made or commercially available processor, a general purpose processor, a central processing unit (CPU), a graphics processing unit (GPU), a digital signal processor (DSP), an auxiliary processor among several processors associated with the controller 114 or 144, a semiconductor-based microprocessor (in the form of a microchip, chip set, system on a chip (SoC)), multiple processor cores, an application specific integrated circuit (ASIC), a field programmable gate array (FPGA) or other programmable logic device, discrete gate or transistor logic, discrete hardware components, or any combination thereof designed to perform the functions described herein. By one form, the controller 144 at the remote system 106 may have one or more processors 146 and other computing components on one or more servers, computers, laptops, desktops, and/or mobile devices such as tablets, smartphones, and so forth, and this may include cloud-based servers. In this regard, the remote system 106 may be realized as a remote information technology (IT) or control center, or otherwise as a maintenance or software update data center or a distributed network of remote control centers that reside at geographic locations that are separate and distinct from one or more edge computing systems that communicate directly with the controller 114 on the aircraft 102.

The memories 118 and 148 may include computer readable storage devices or media such as volatile and nonvolatile storage in read-only memory (ROM), random-access memory (RAM), flash memory, registers, and cache. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 114 or 144. The bus serves to transmit programs, data, status and other information or signals between the various components coupled to the controller 114 or 144. The bus can be any suitable physical or logical means of connecting computer systems and components. This includes, but is not limited to, direct hardwired connections, fiber optics, infrared, and wireless bus technologies.

The executable instructions may include or establish one or more separate programs, each of which comprises an ordered listing of executable instructions for implementing logical functions. The instructions, when executed by the processor, perform logic, calculations, methods and/or algorithms, and generate data based on the logic, calculations, methods, and/or algorithms. Although only one of each of the controllers 114 and 144 are shown in FIG. 1, implementations of the system 100 can include any number of controllers 114 and 144 that communicate over any suitable communication medium or a combination of communication media and that cooperate to perform logic, calculations, methods, and/or algorithms, and generate data. In various implementations, the controllers 114 and 144 each includes or cooperates with at least one firmware and software program (generally, computer-readable instructions that embody an algorithm) for performing the various process tasks, calculations, and control/display functions described herein. During operation, each of the controllers 114 and 144 may be programmed with and execute at least one firmware or software program. This may include programs or applications stored in memory 148 such as an aircraft data unit 152, an external data unit 158, a flight tracking unit 159, a performance analysis unit 160, and a flight operation assessment unit 162, and sub-units or modules of any of these that embody one or more algorithms to be operated by controller 114 to thereby perform the various process operations, tasks, calculations, and control/display functions described herein.

Each of these units may have or use a database that is considered part of memory 148 or another memory.

Each of the controllers 114 and 144 may exchange data with one or more external sources to support operation of the system 100 in various implementations. In this case, bidirectional wireless data exchange may occur via the communications systems 110 and 140 over a communications network 108, such as a public or private network implemented in accordance with Transmission Control Protocol/Internet Protocol architectures or other conventional protocol standards. Encryption and mutual authentication techniques may be applied, as appropriate, to ensure data security.

In various implementations, each of the communications systems 110 and 140 are configured to support instantaneous (i.e., real time or current) communications between various systems. The communications systems 110 and 140 may each incorporate one or more transmitters, receivers, and the supporting communications hardware and software required for components of the system 100 to communicate as described herein. The network 108 used for communication may be a wireless gateway such as a data link management wireless (DLM-W) system that provides communication among systems within a cockpit and on an aircraft as well as transmission between the aircraft and the ground, Aircraft Communication Addressing and Reporting System (ACARS), which uses VHF, HF, or satellite communication (SATCOM) (whether via Wi-Fi or other network), VHF Data Link (VDL), High-Frequency Data Link (HFDL), and air-to-ground (ATG) systems. Other networks may be used when the aircraft 102 is on the ground such as cellular networks and ground Wi-Fi Networks while an aircraft is at a gate, taxiing, or at a remote location on the ground from a specific maintenance base. Any combination of these may be used. In various implementations, one or both the communications systems 110 and 140 may include additional communications not directly relied upon herein, such as bidirectional pilot-to-ATC (air traffic control) communications via a datalink, and any other suitable radio communication system that supports communications between the aircraft 102, the remote system 106, and various external source(s). The communications described herein also may apply to the feedback display device where suitable.

Each of the memories 118 and 148 can encompass any number and type of storage media suitable for storing computer-readable code or instructions, such as the applications or units mentioned above as well as other data generally supporting the operation of the system 100. As can be appreciated, each of the memories 118 and 148 may be part of their respective controller 114 or 144, separate, or both.

Returning to the aircraft 102, the onboard data sources 132 supply various types of data and/or measurements to the controller 114 so that the various avionics systems can generate relevant parameters, such as the state and condition of the aircraft 102 including the actual states of the flight components, equipment, engines, and so forth on the aircraft. The parameters or flight operations described herein also may include flight any control settings including flight and engine control settings, this may also include obtaining avionics value settings at each of the avionics systems, such as autopilot or real pilot input values (or default values) for various parameters such as speed, altitude, and so forth. Thus, the monitoring of avionic systems 126 such as the autopilot, navigation, and/or flight management systems (FMS) 128 to name a few examples may be monitoring real-time task execution, CPU loads, memory usage, data integrity, error logging, redundancy management, and so forth, in addition to providing the expected parameter values to be compared to actual parameter values generated from physical sensors on aircraft physical components. The onboard data sources 132 may use an array of sensors 134 of various types to detect the actual condition or position of the components and equipment on the aircraft. The details and operation of the types of sensors 134 are not needed for the understanding of the disclosed system and method.

In example implementations, the aircraft display device 120 is an electronic display capable of graphically displaying flight information or other data associated with operation of the aircraft 102. The aircraft display device 120 is communicatively coupled to, and controlled by, the display control unit 122 and/or processors 116. In this regard, the processors 116 and the display control unit 122 are cooperatively configured to display, render, or otherwise convey one or more graphical representations or images associated with operation of the aircraft 102 and relevant here, optionally can display feedback-related pages on the aircraft display device 120, as described in greater detail below. Generally, aircraft display devices 120 visually convey a considerable amount of situational information for pilots. The displayed information is sourced from various databases, sensors, transponders, broadcasts, and FMS computations. The information is often organized in "information layers" (e.g., flight path information, Navigational Aids (NAVAID), airspace information, terrain information, weather information, traffic information, etc.). The various information layers are combined to provide a unified graphical display on the avionics display device 120.

In various implementations, the aircraft display device 120 may be a multifunction control display unit (MCDU), cockpit display device (CDU), primary flight display (PFD), primary engine display (PED), multi-function display (MFD), navigation display (ND) which may include a horizontal situational display (HSD) or horizontal situation indicator (HIS), a vertical display that displays vertical trajectories or profiles (or data of vertical trajectories), or any other suitable multifunction monitor or display suitable for displaying various symbols and information described herein. The aircraft display device 120 may be configured to support multi-colored or monochrome imagery, and the aircraft display device 120 may have a liquid crystal display (LCD), a light emitting diode (LED) display, an organic light emitting diode (OLED) display, a heads-up display (HUD), a heads-down display (HDD), a plasma display, a projection display, a cathode ray tube (CRT) display, or the like.

The user interfaces 124 (or user input interface) is a user interface coupled to the processors 116, and the user interface 124 and the processors 116 are cooperatively configured to allow a user (e.g., a pilot, or crew member) to interact with the aircraft display device 120 and/or other elements of the system 100. Depending on the implementation, the user interface 124 may be a keypad, touchpad, keyboard, mouse, touch panel (or touchscreen), joystick, yoke, steering wheel, knob, line select key, or another suitable device adapted to receive input from a user. These interface devices are on or part of aircraft display device 120, or are wired or wirelessly connected to the aircraft display device 120. This may include any controller or input device for controlling the motion of the aircraft in addition to any input device being used for feedback analysis described herein. In some implementations, the user interface 124 is, or includes, an audio input device, such as a microphone, audio transducer, audio sensor, or the like, accompanied with audio speech recognition and other software to input commands to an FMS 128, or other system or unit on the aircraft for example. In some implementations, the user interface 124 is a tactile user input device capable of receiving free-form user input via a finger such as with touchpads or touch screens, stylus, pen, or the like. Specifically for any pilot inputs described herein, the aircraft display device 120 may display graphical user interfaces while an user interface 124 may include a touch screen directly on, or forming, a screen of the aircraft display device 120. By other approaches, the GUIs on the screen of the aircraft display device 120 may be a mouse cursor guided by a mouse or other type of controller forming the user interface 124.

The display control unit 122 has the hardware, firmware, processing logic and/or other components configured to control the display and/or rendering of one or more displays pertaining to operation of the aircraft 102 and/or avionics systems 126 and FMS 128 described below, and displays on the aircraft display device 120 (e.g., synthetic vision displays, navigational maps, HSDs, vertical profile (trajectory) displays, and the like). Also, the display control unit 122 may access or include one or more avionics databases (not shown) to generate image data for displays.

Still referring to FIG. 1, in one or more example implementations, the processors 116 on the aircraft 102 are coupled to the avionics systems including the FMS 128, the communications systems 110, as well as other avionics systems 126 such as a navigation unit or system, and one or more additional avionics units to support navigation, flight planning, and other aircraft control functions, as well as to provide real-time data and/or information regarding the operational status of the aircraft 102 to the processors 116. It should be noted that the system 100 and/or aircraft 102 will likely include numerous avionics systems for obtaining and/or providing real-time flight-related information that may be displayed on the aircraft display device 120 or otherwise provided to a user (e.g., a pilot). For example, practical implementations of the aircraft system 100 and/or aircraft 102 will likely include one or more of the following avionics systems 126 suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag (EFB) and/or any other suitable avionics system. Each of these avionics systems or unit may include and/or use a database suitably configured to support operations of the avionics system 126 such as a terrain database, an obstacle database, an air restriction database, a navigational database, a geopolitical database, a terminal airspace database, a special use airspace database, and so forth for generating, rendering, and/or displaying navigational maps and/or other content on the aircraft display device 120 or to store and find other aircraft related data.

The FMS 128 may be configured to provide real-time navigational data and/or information regarding the operation of the aircraft 102 both to the pilot and to be transmitted to monitoring systems such as the flight operation assessment unit 162 at the remote system 106. The FMS 128 and similar systems receive input from various sources including an ATC, the pilots, sensors, the navigation databases mentioned, and so forth, and uses the inputs to compute flight plans including horizontal and vertical trajectories. The output showing a flight plan is then displayed or otherwise provided to the aircrew, and this may include flight information including waypoints, altitudes, airspace limitations, airspeed settings, and so forth.

The avionics systems 126 also may include a performance unit or system that collects sensor data and places the data in a performance database for flight plan processing. The performance system may use the sensor data to convert measurements into a format or measurement units (kph for example) of performance parameters for use by the other units of the FMS 128. Such performance parameters may include aircraft state and condition (such as weight, fuel level, etc.), position (altitude and lateral location), attitude (roll, pitch, and yaw), airspeed, vertical speed, aircraft control settings such as for thrust, drag management, and so forth, fuel consumption, flight path data, and so on. The performance system can determine actual, current state, or past aircraft performance at a point in time or flight path location, or can compute estimated performance at a down-path location on a flight plan. Monitoring of the performance system provides data for feedback analysis and aircraft protocol updating described herein. Any of this performance data may be transmitted to the performance analysis unit 160 at the remote system 106.

The avionic systems 126 also may have a separate weather system or unit that may have current weather conditions (or saved conditions at a certain time point) obtained from aircraft sensor data at sensor unit (not shown), wireless transmission from remote weather sources including the ATC or weather information servers, but also from the pilot or crew via FMS input pages displayed on the user interface 124. Such information may include wind direction and speed, precipitation, humidity, air pressure, and so forth. The weather or climate (or environmental) information that occurs during a flight may be transmitted directly to the external data unit 158 at the remote system 106 as well as to the aircraft 102.

The avionic systems 126 may include an ADS-B unit that broadcasts and receives position, attitude, and direction transmitted between aircrafts, and may be used to determine air traffic constraints in addition to air traffic data, instructions, and/or altitude constraints received from the ATC or other sources. Any of this traffic related data also may be transmitted to the external data unit 158 at the remote system 106 as well as to the aircraft 102.

Figure 2:
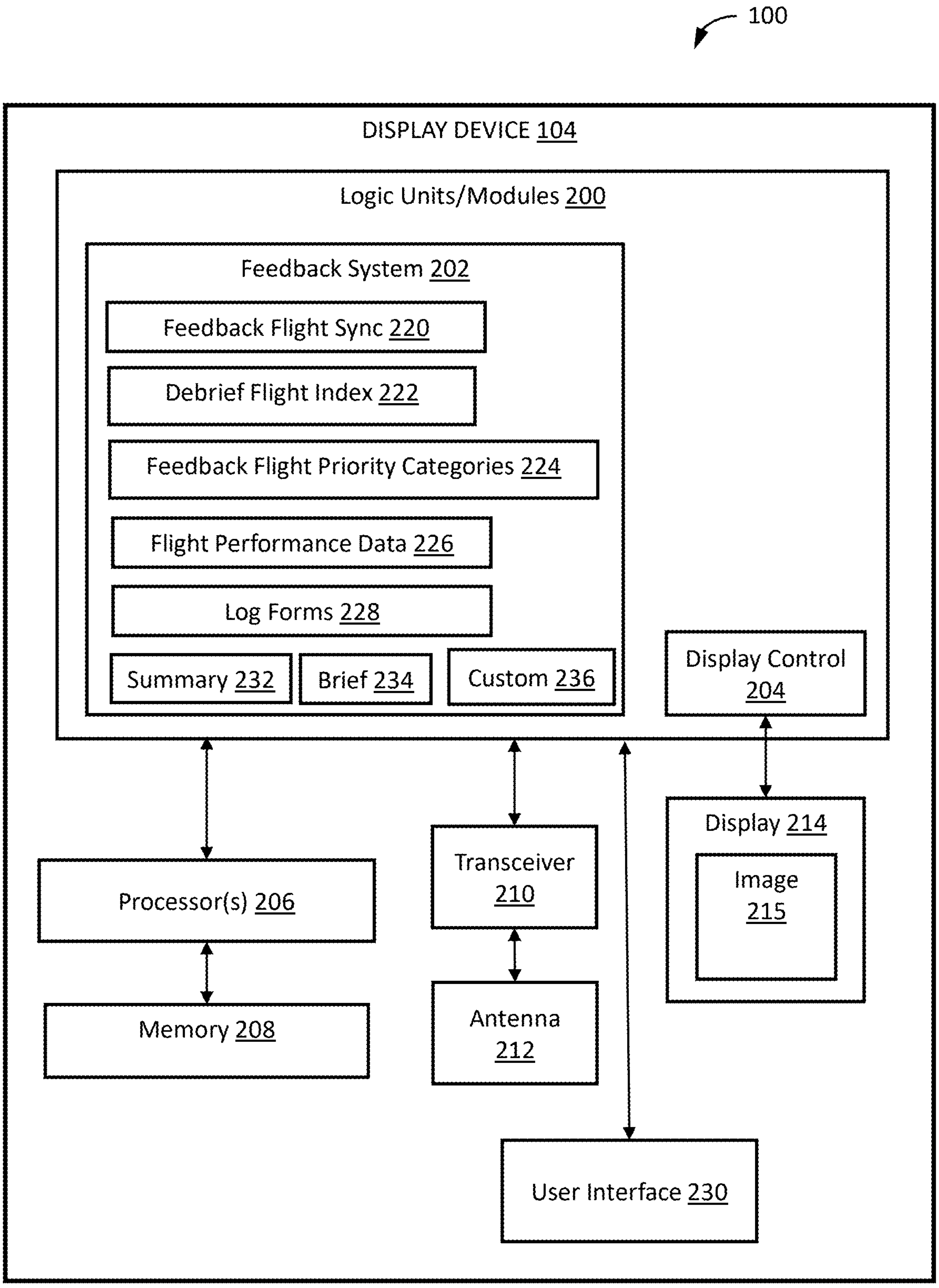
FIG. 2 is a schematic diagram of an example display device used to capture pilot feedback according to at least one of the implementations described herein.

Referring for now to FIG. 2, a feedback display device (or FB display device or just display device) 104 may be provided to display feedback pages that can be filled out by a pilot or used to submit feedback information from the pilot to the remote system 106. The FB display device 104 may be the aircraft display device 120 but has no such limit to be on the aircraft and can be any suitable computing device or mobile display device including computers, laptops, desktops, and/or mobile devices such as tablets, smartphones, and so forth as long as the FB display device 104 has a display screen to show feedback page images to a user or pilot.

The FB display device 104 may have logic units or modules 200 held in a memory 208, one or more processors 206 to operate the logic units 200, a transceiver 210 and antenna 212 to receive or transmit feedback and other data between the FB display device 104 and the remote system 106 and/or the aircraft 102. The FB display device 104 also may include a display screen 214 showing an image 215, and at least one user interface 230. The logic units 200 may at least have a display control 204 for controlling a display screen 214 and a feedback system 202 with a feedback flight sync unit 220, a debriefing flight index unit 222, an optional feedback flight priority categories unit 224, a flight performance data unit 226, and a log forms unit 228. The feedback system 202 also may have a summary unit 232, a brief unit 234, and a custom report unit 236.

The circuitry and components that form the hardware, firmware, and software (or any combination thereof) of the components of the FB display device 104 are already described with suitable circuitry and components of similar components of the aircraft 102 and remote system 106 including, for some examples, the circuitry and components forming the processors 116 and 146 also describe the circuitry of the processors 206 here, and the description of aircraft display device 120 also applies for much of the components and circuitry to display screen 214 and need not be described again.

Returning to FIG. 1 again for more detail, the avionics systems 126 and the FMS 128 receive flight protocols via communications system 110 that include flight plan constraints or targets for flight planning and that may change depending on a flight plan priority, such as fuel efficiency or low waste emissions protocols. The aircraft protocols also may include flight operation procedures that should be followed in particular situations, such as approaching severe weather for example. These protocols may be received (and updated) from the remote system 106 or other regulatory, standards, or regional (such as an airport) entity. The aircraft operations set according to the received aircraft protocols may be referred to herein as protocol aircraft (or vehicle) operations.

After or during a flight, data that indicates the flight operations and flight plan performed on a flight is collected and transmitted, via communications system 110, to the remote system 106. This includes data originating from the sensors or avionics systems indicating the state of the aircraft (position, orientation, etc. as well as the control settings on the aircraft) during a flight as well as the environment around the aircraft during the flight and so forth. This refers to actual or implemented aircraft (or vehicle) operations herein.

Now turning to the remote system 106, the aircraft data unit 152 has a flight plan unit 154 and an actual flight unit 156 to receive the implemented aircraft operational data that actually occurred during a flight. The flight plan data may be, or may be associated with, protocol aircraft or flight operations that should have been followed. This may be in the form of a protocol flight plan entered into the avionics systems on the aircraft or may be generated from the protocols at the remote system 106 itself. A performance analysis unit 160 determines the actual performance values to compare to target performance goals for implemented aircraft or flight protocols, or in other words, flight plan priorities (such as fuel efficiency for example). The flight operation assessment unit 162 has a priority data unit 172 that generates protocols in the first place and provides the protocols to the aircraft. Thereafter for flight operation assessment of a flight that already occurred (or is occurring), a differencing unit 164 may first determine whether a significant difference in actual and target performance or other difference results exists. The difference is caused by, or is, the difference between use of protocol flight (or vehicle) operations versus actual or implemented vehicle or flight operations. When this difference is significant, a flight operations assessment unit determines whether feedback information requested from the pilot or user explains why the difference occurred. The difference in result or performance may be transmitted back to the FB display device 104 to display the performance differences to the user or pilot.

Turning to the FB display device 104 (FIG. 2), a pilot now may view the performance differences and is provided the opportunity to enter responses to questions relevant to one or more aircraft or flight protocols, and in turn, flight plan priorities. Specifically, the varying components of the FB display device 104 has the feedback system 202 to display different feedback pages to the pilot, and including the feedback flight sync unit 220 that shows which flights have and have not been synced with the remote system 106 to transmit feedback information, the debriefing flight index unit 222 to list flights so that a pilot can enter feedback for a particular flight, optionally the feedback flight priority categories unit 224 so that a user can select which one or more flight priorities (or aircraft protocols) are the subject of the feedback when more than one is available, the flight performance data unit 226 to retrieve and display performance data of the flight, and the log forms unit 228 that provides a feedback page with specific questions requesting feedback information. Other units of the feedback system 202 include a summary unit 232 to show summaries of the feedback, protocol, and other data, a brief unit 234 to show a briefing page that indicates protocols and protocol operations that can be used during flight planning, and a custom report unit 236 to generate custom reports. Upon receiving feedback information from the user or pilot, the transceiver 210 of the FB display device 104 transmits the feedback information to the remote system 106.

At the remote system 100 again, the flight operation assessment unit 162 has a pilot feedback unit 166 to receive the feedback information. A flight planning (FP) protocol and database (FP protocol/DB) unit 170 then either provides for manual or automatic updating of the flight or vehicle protocols. Specifically, the FP protocol/DB may organize the feedback data, protocol data, and other relevant data and arrange for display of the data on a display or display device 180 so that a user of the remote system 106 can manually decide whether to update or add a protocol, and how to perform the update. Typically this will be by adding a situation indicated by the feedback information and to the protocol, and then determining and adding flight or vehicle operations that should be performed when that situation is detected on the aircraft (whether by the pilot or automatically by an avionics system). Otherwise, the FP protocol/DB unit automatically analyzes the feedback information and determines if a new situation causing a significant lack of performance should be added to a flight or vehicle protocol whether to add a new protocol or modify an existing protocol. The added situation may have one or more new protocol aircraft or vehicle operations that should be performed when the new situation is detected as explained above. The protocol aircraft operations may be set in a database to correspond or be assigned to the associated situation for the associated aircraft or vehicle protocol. By one example form, the FP protocol/DB unit 170, or other unit of remote system 106, may provide the modified or updated protocols to the aircraft 102 for subsequent flight planning and aircraft operations as desired. Otherwise, the updated protocols may be placed in memory and accessible for retrieval by aircraft or pilots as needed. The display 180 may be formed of those components such as circuitry, hardware, software, firmware, combinations thereof, interfaces, display screen, and so forth as already described for aircraft display device 120.

Figure 3A:
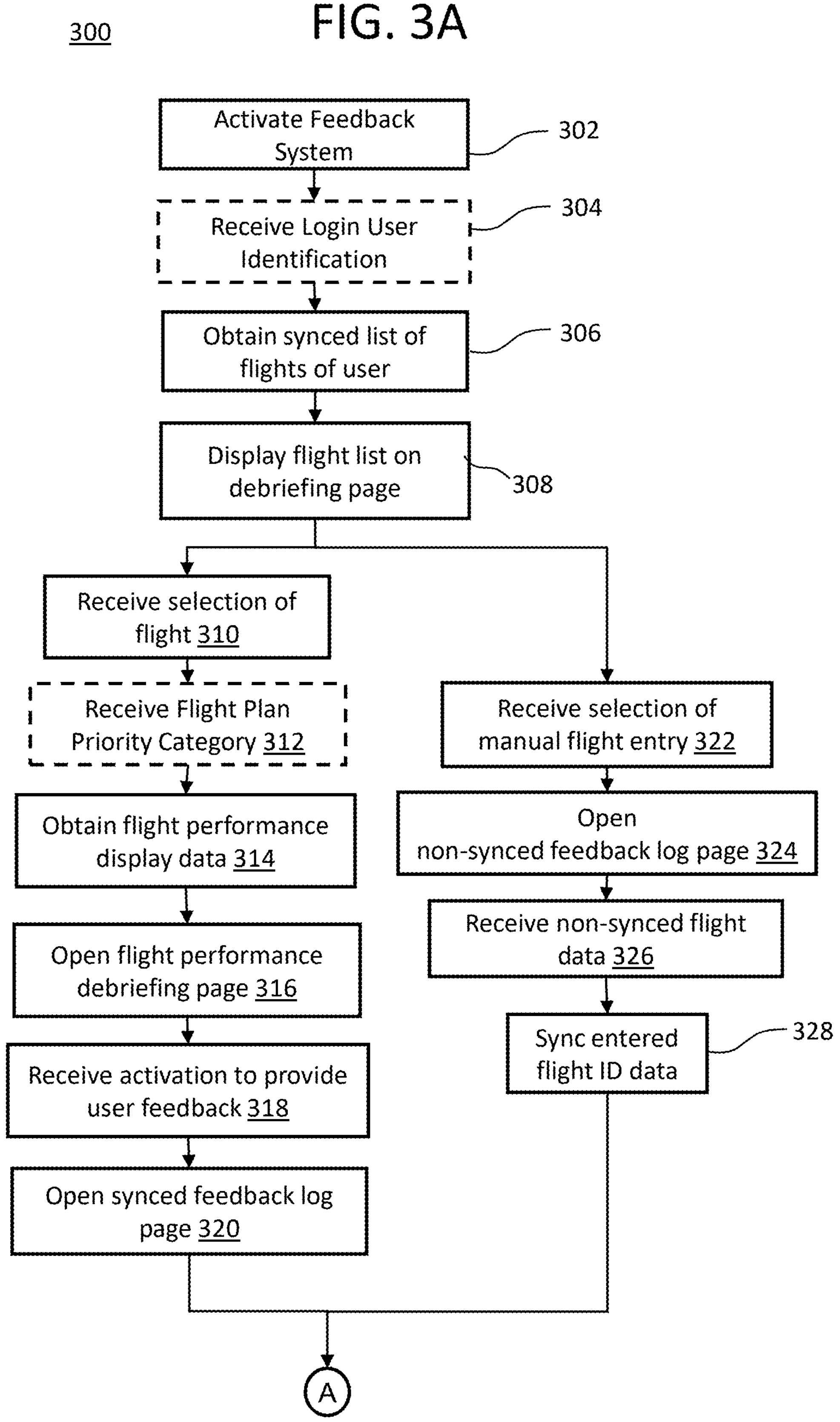
FIGS. 3A-3B is a flow chart of an example method of obtaining pilot feedback according to at least one of the implementations described herein.
Figure 3B:
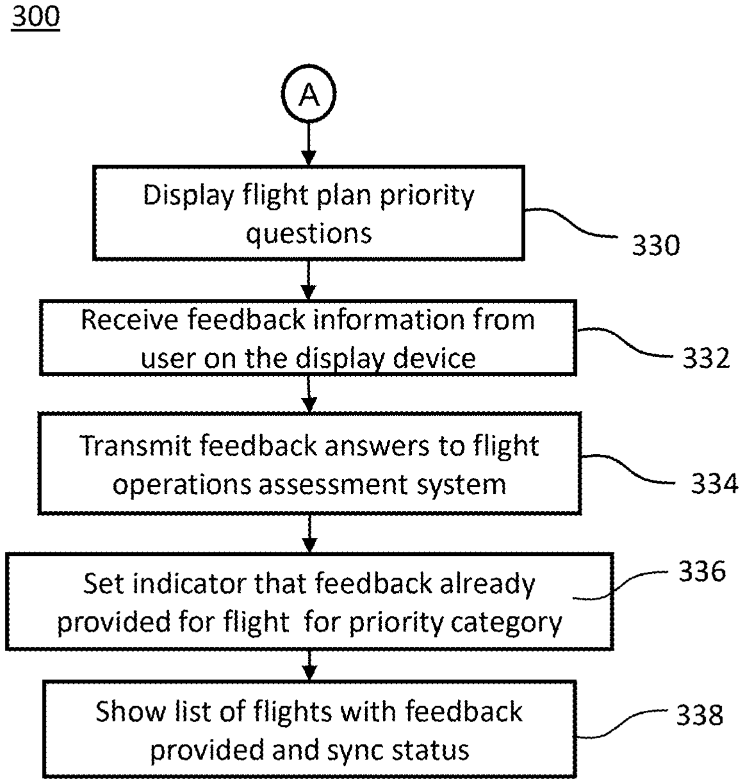
Figure 4:
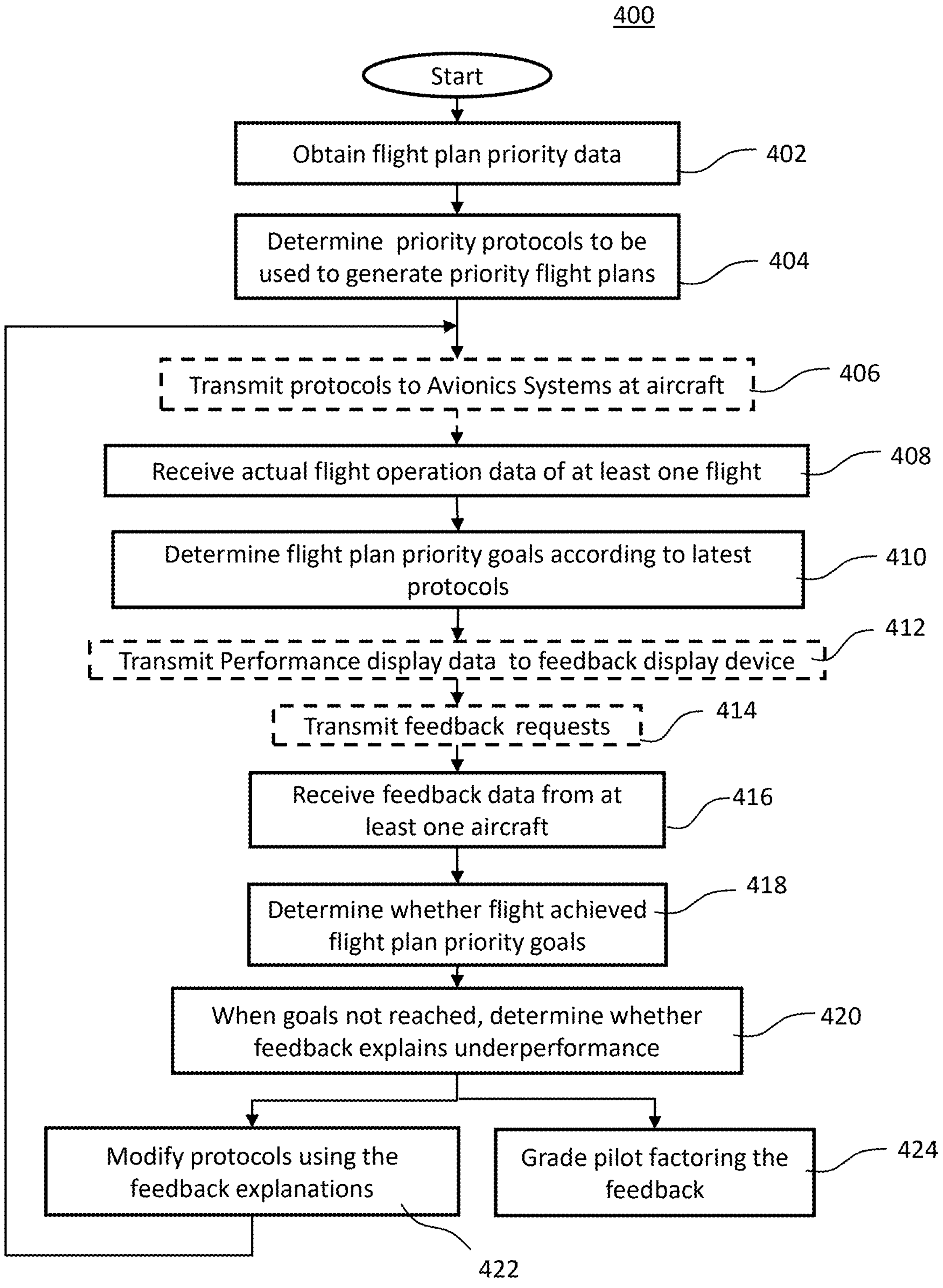
FIG. 4 is a flow chart of an example method of performing flight operation assessment using pilot feedback according to at least one of the implementations described herein.

Referring now to FIGS. 3A-3B, a process 300 for obtaining pilot feedback to perform flight operation assessments is described according to at least one of the implementations herein. The flight operation assessment process 400 (FIG. 4)

that uses the feedback is described below. The process 300 includes operations 302 to 338, generally numbered evenly. Systems, device, modules, units, and display page images of any of FIGS. 1-2 and 4-9 may be referred to describe process 300, where relevant.

The feedback system 202 on the FB display device 104 may have a set of feedback pages of images displayed as or on graphical user interfaces (GUIs) that can receive inputs from a pilot or user, and this may include touch screens as described above. When the user is to enter text data onto a display page, a popup virtual keyboard may be displayed (not shown) or a physical keyboard may be used. By one form, the feedback pages include at least a main debriefing page, a detailed or performance debriefing page, a synced flight log feedback page, a non-synced flight log feedback page, and a feedback flight list page, as described in detail below. It will be understood that more or different pages, page formats, and/or page linking can be used than that described herein.

Process 300 may include "activate feedback system" 302. Where any avionics page or startup screen (or desktop) and so forth may display a button or other GUI activator on the display screen of the FB display device 104 to start the feedback system. This may include an icon for a feedback system app (or application) that can be clicked on to open and initiate the feedback system, or any other GUI image on any desired page shown on the FB display device 104, a heads up display, or any convenient location of a display. Otherwise, the activator may be a physical switch on the FB display device 104 or any other suitable object (such as an aircraft instrument panel or console). Many variations are contemplated.

Optionally, process 300 may include "receive login user identification" 304, where a login page may be displayed to a user, and as one example, that receives a keyed in identification (and password when desired) of the user or may use finger, face, or other biological recognition instead, or other login techniques. Otherwise, the login identification may be saved to immediately open the feedback system 202 upon activation. Many variations are contemplated.

Process 300 may include "obtain synced list of flights of user" 306, where synced here refers to a flight already identified by the flight tracking unit 159 at the remote system 106. This may be performed by the feedback flight sync unit 220 on the feedback system 202 on the FB display device 104. For this operation, and once a user is logged in, a signal may be sent to the remote system 106 to retrieve the user's flight record if not already stored on the FB display device 104 or another location, and particularly from the flight tracking unit 159 and a database thereof. The flight tracking information may include the flight departure and arrival locations, times, and date of the flight, the flight number, the aircraft type, tail number, and any other desired data of a flight. This also may include which flight plan priorities (or aircraft protocols) were used during the flight, and whether feedback data has already been gathered for the flight and for which specific flight plan priority. This data is then transmitted to the debrief flight index unit 222 of the feedback system 202 on the FB display device 104. Otherwise, as mentioned, the FB display device 104 may have its own flight tracking database and flight tracking manager (not shown) for the feedback.

Figure 5:
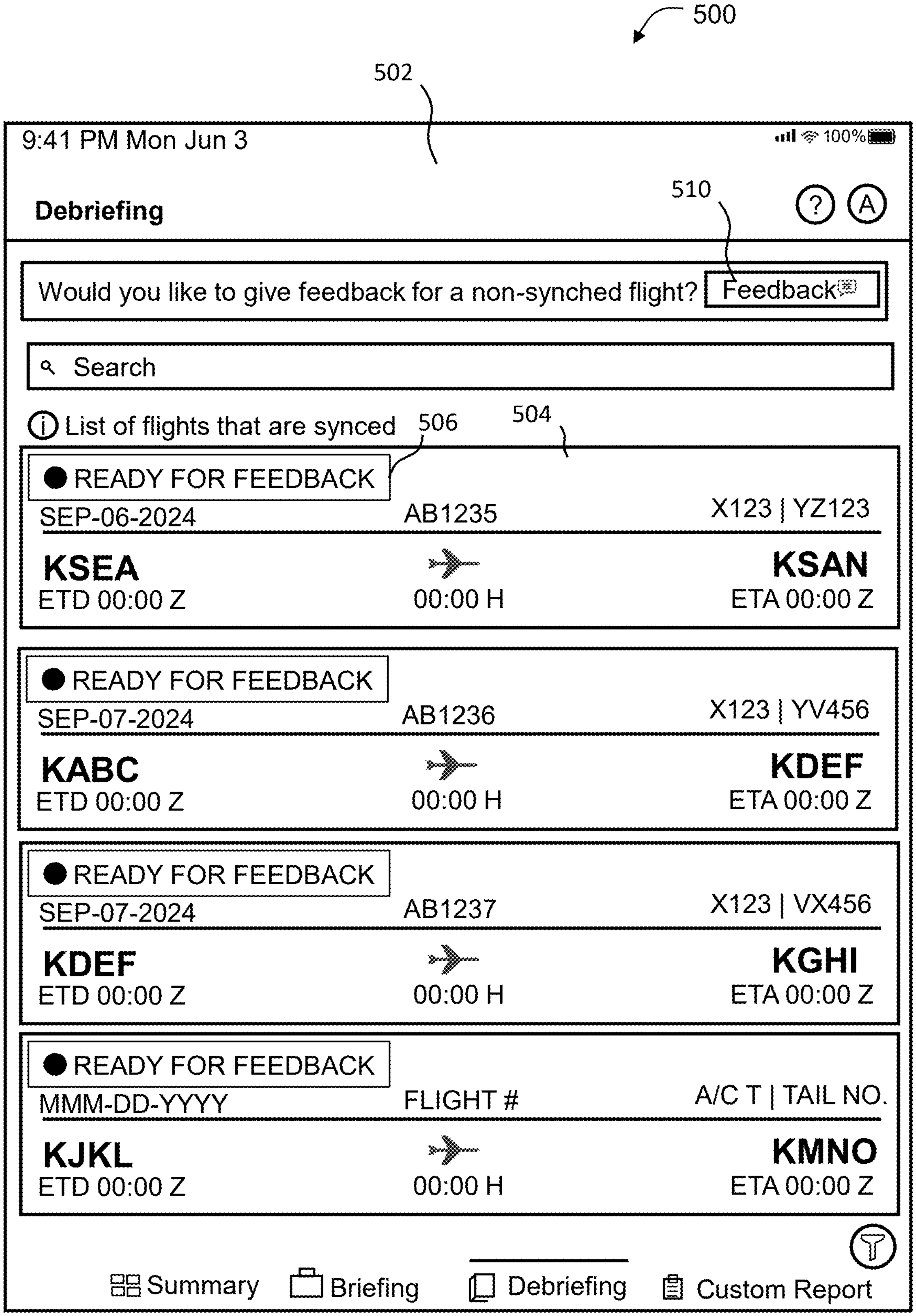
FIG. 5 is a schematic diagram of an example feedback page of a pilot feedback system to display to a user according to at least one of the implementations described herein.

Referring to FIG. 5, process 300 then may include "display flight list on debriefing page" 308, where the debrief flight index unit 222 may generate a main debriefing page 500 (or image or display) that lists the flights flown by the pilot and that are already synced. Each listed flight may have a flight window 504 that shows the flight information retrieved from the flight tracking unit 159 or other unit including the departure location (KSEA for example), departure location (KSAN for example), and so forth as mentioned above, and may each have a feedback ready indicator 506 that shows "ready for feedback". The feedback ready indicator 506 may be highlighted or have a light or filled in dot or bullet as shown to indicate feedback can be entered. If so, the pilot may touch or click on the flight listing and/or the feedback ready indicator 506 if it is a virtual button so that process 300 may include "receive selection of flight"310.

Figure 6:
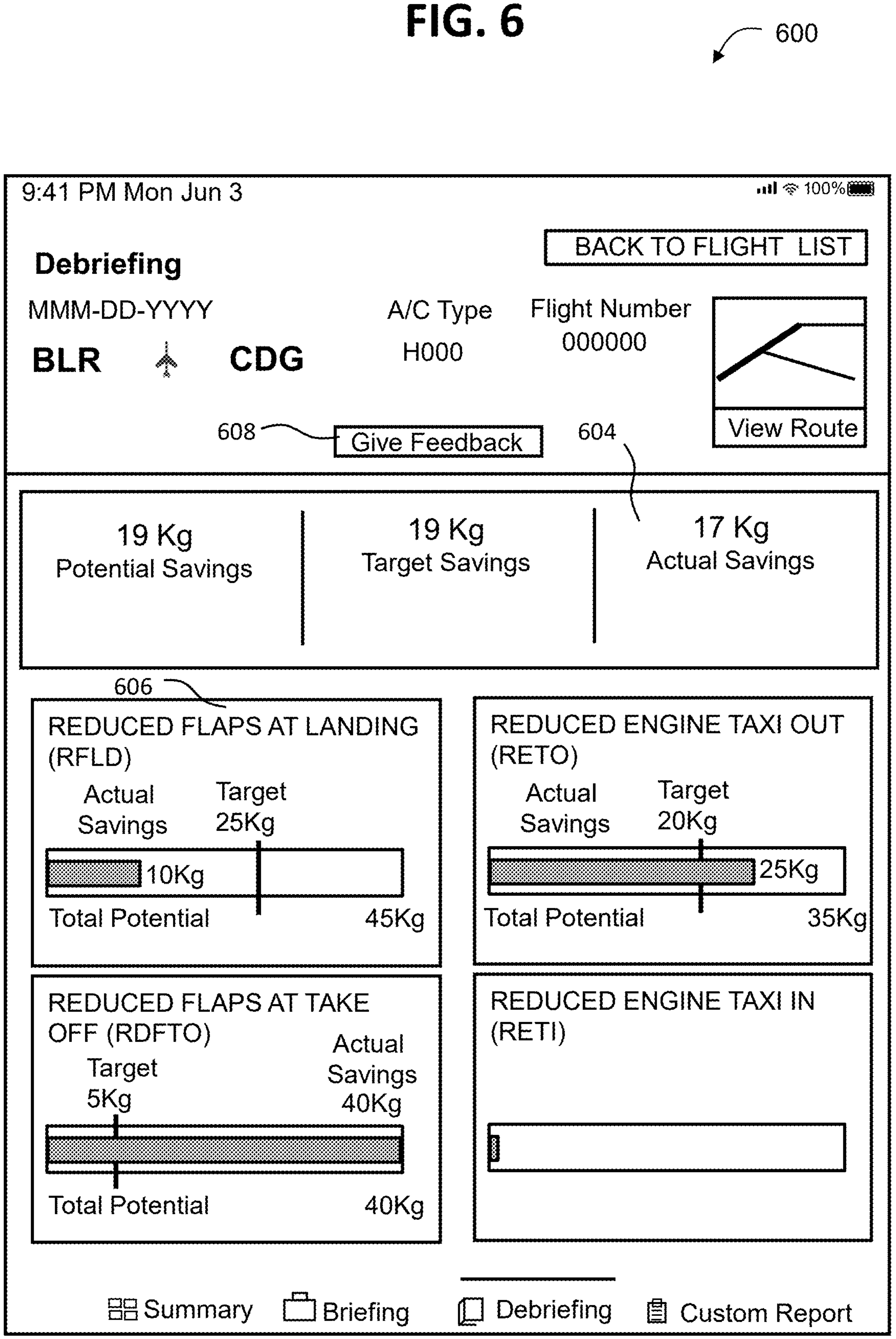
FIG. 6 is a schematic diagram of another example feedback page of the pilot feedback system to display to a user according to at least one of the implementations described herein.
Figure 7:
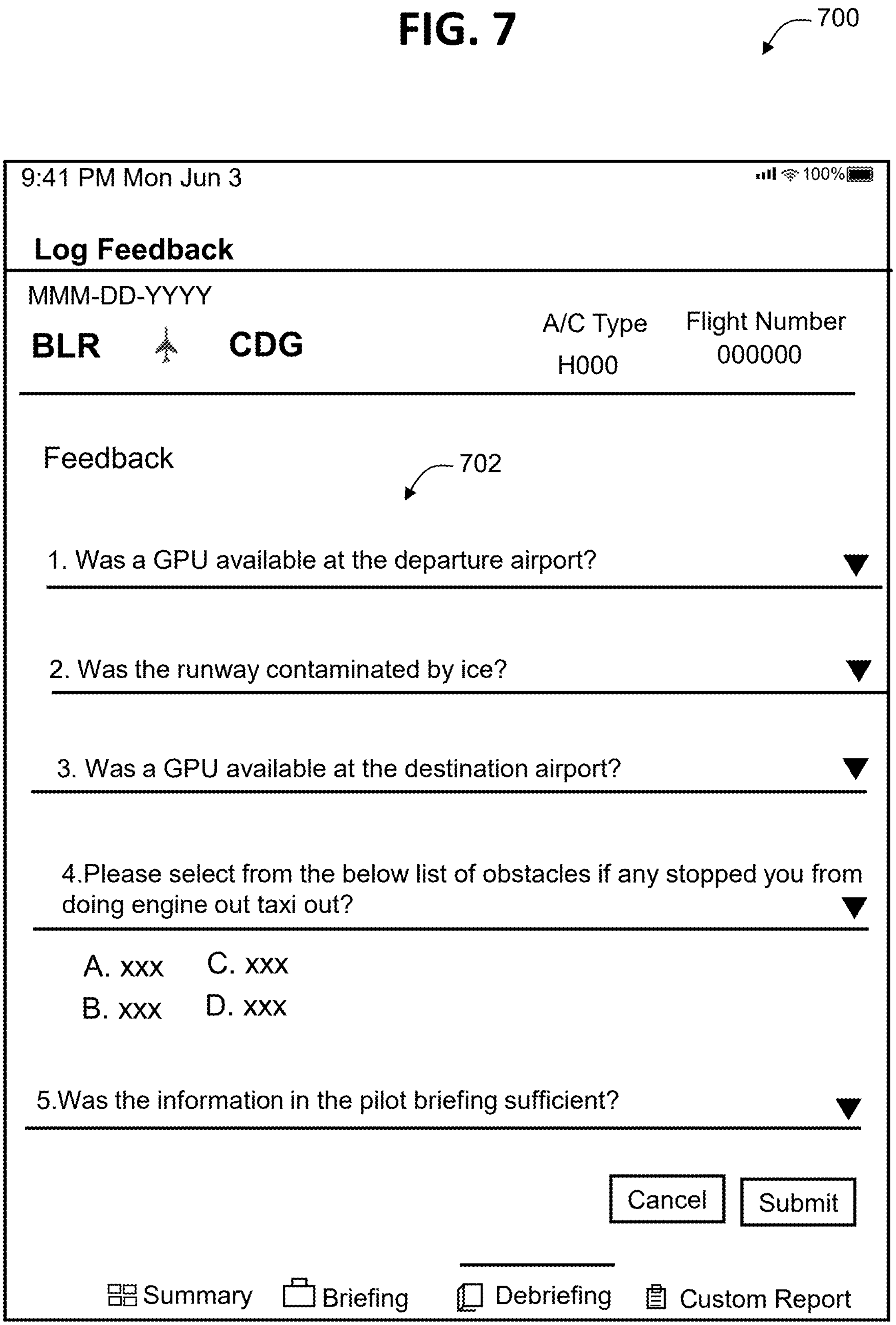
FIG. 7 is a schematic diagram of yet another example feedback page of the pilot feedback system to display to a user according to at least one of the implementations described herein.
Figure 8:
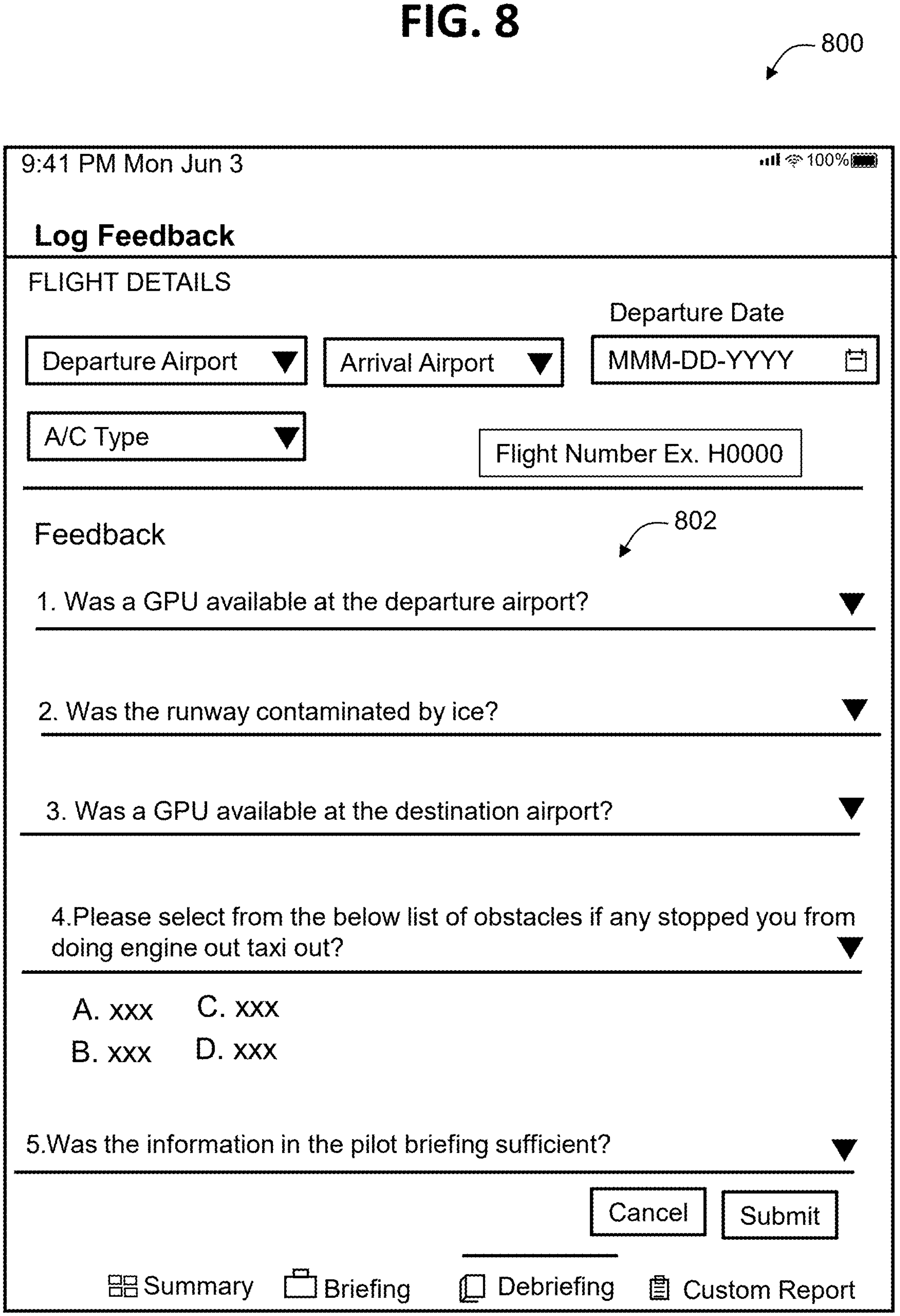
FIG. 8 is a schematic diagram of a further example feedback page of the pilot feedback system to display to a user according to at least one of the implementations described herein.

When the flight selection is received, and by one form, when the feedback system 202 is arranged to provide feedback for a single flight plan priority and/or aircraft protocol, the process continues to directly display either a detailed (or flight performance) debriefing page 600 (FIG. 6) or may go directly to a log feedback page 700 or 800 (FIGS. 7-8).

However, by another alternative, process 300 first may include "receive flight plan priority category" 312. This operation has a feedback flight priority categories unit 224 display a flight plan priority or aircraft protocol category selection page (not shown), also referred to as just a category page or list herein, so that the user can select one or more available flight plan priorities or aircraft protocols on the category page. By one form, the category page only lists those flight plan priorities or aircraft protocols that were used on the flight selected by a user to enter feedback information.

The available flight plan priorities or aircraft protocols on the category page may be any that are provided for improving safety, efficiency, environmental impact, passenger experience, and so forth. This may include some example protocols of (1) fuel efficiency directed to maintaining target fuel loads and minimizing fuel consumption to reduce costs and emissions, (2) emission reduction to focus on lowering $CO_2$, NOx, and other harmful emissions to comply with environmental regulations and mitigate climate change impacts, (3) Safety protocols to provide for planning routes to avoid severe weather, restricted airspace, and other potential conflict zones, (4) time efficiency for route planning for shortest distance and favorable winds, while adhering to air traffic management instructions to avoid congestion and delays, (5) operational flexibility to be maintained by planning for alternate airports and in-flight adjustments, (6) compliance with regulatory requirements, such as noise abatement and environmental standards, (7) passenger experience including comfort, safety, and entertainment by minimizing turbulence, providing for electronic displays and audio systems, safety procedures, and so forth, (8) cost efficiency achieved by managing operational expenses and aligning routes with maintenance needs, and (9) cargo considerations for cargo aircraft that may involve target weight distributions and meeting specific cargo requirements to name a few example protocols. Other details of these protocols are provided below.

Thus, when either only a single aircraft protocol is available, or when one or more selected aircraft protocols are received by using the category selection page, thereafter either the flight performance page 600 is shown or a log feedback page (700 or 800) is shown. This may be an automatic selection between the two types of displays (performance debriefing or log feedback), or the user may be provided with an option to select between the two types of displays.

When the flight performance page is selected, process 300 may include "obtain flight performance display data" 314 and provided by the flight performance data unit 226 of the feedback system 202, and for the protocol(s) to be analyzed with feedback information. Here in this example, it is assumed that the set or selected protocol to receive feedback is for fuel efficiency. Real-time experience of pilots can have a significant impact on flight planning for fuel efficiency. This may include improving flight paths as one example. Currently, pilots often follow predefined routes and altitudes, often based on air traffic control (ATC) instructions and airspace management systems. However, pilots can offer insights into real-world conditions, such as unexpected weather patterns or turbulence, which may cause deviations from optimal fuel-efficient paths. By communicating these challenges to operational teams and a flight operation assessment unit 162, pilots can help refine protocols to account for more flexibility, perhaps by increasing the use of free route airspace (FRA) or dynamic routing that adapts to real-time conditions.

As another random example, pilots also may provide valuable feedback regarding how altitude changes affect fuel consumption and emissions. For instance, while some protocols might suggest flying at higher altitudes for better fuel efficiency, pilots might report that on certain routes or in specific weather conditions, staying at lower altitudes could be more fuel-efficient due to wind conditions or atmospheric stability. In such cases, pilot feedback could lead to adjustments in flight planning and the flight operation assessment unit 162, enabling it to factor in more precise weather data or regional trends in atmospheric conditions, optimizing fuel consumption more effectively.

Additionally, as another random example, pilots may be able to explain the reasons why a specific fuel-saving protocol may be unachievable on certain flights if not already part of the flight operation assessment unit 162. For example, protocols that require flying at reduced speeds for better fuel efficiency might not be feasible due to ATC requirements to maintain specific speed levels, particularly in congested airspace or busy flight corridors. By providing feedback on such restrictions, pilots can help to highlight the operational trade-offs that exist between fuel efficiency and maintaining safety or punctuality, prompting reevaluation of such protocols in certain airspaces.

For these reasons, and others, performance metrics may be generated by using the monitored aircraft and flight data obtained from the aircraft flown by the pilot providing the feedback information. This may include performance metrics related to preventive maintenance guidelines, flight route plan guidelines, weight balance, autopilot best practices settings, and discretionary fuel optimization, and specifically for determining fuel efficiency during different stages of a flight such as for flight stages or situations (or conditions) of engine-out block off, taxi in or taxi out including single or reduced engine taxi in or out, or auxiliary power unit (APU) shut-down during taxi, take-off or climb including reduced thrust take-off, continuous climb, rolling take-off, reduced acceleration altitude, reduced flaps at take-off, cruising such as shortcut detection or cost index optimization, and descent or landing including reduced flaps at landing, continuous decent approach, or idle reverse thrust, and so forth. The performance data may be generated by the performance analysis unit 160 at the remote system 106 and then transmitted to the FB display device 104 by the performance display unit 168 of the pilot feedback unit 166. Details of other flight plan priorities (including flight operation priorities or protocols) are described below with assessment process 400 (FIG. 4).

Referring to FIG. 6, once the performance data is retrieved, process 300 may include "open flight performance debriefing page" 316. An example detailed or flight performance debriefing page (or just performance page) 600 identifies the selected flight (here BLR to CDG) and accompanying identification flight data as described above as well as a "view route" window to show the route of the flight when selected. The flight performance page 600 shows performance data in an example overall performance window 604 with flight plan priority goals and achievements (or metrics) relevant to the identified flight plan priority, such as fuel efficiency here. The example overall metrics here includes potential savings, target savings, and actual savings in fuel load, although more or a combination of different overall metrics can be shown instead. Also, other detailed performance data is shown in example windows 606 for each detailed or single performance data metric available, here being reduced flaps at landing (RFLD), reduced engine taxi out (RETO), reduced flaps at takeoff (RDFTO), and reduced engine taxi in (RETI). Here, which metrics are to be displayed may be static or a menu of the metrics may be shown to a user for selection to be displayed. Other variations may be used. The RETI metric did not have a sufficient amount of data so that the RETI metric window was not populated with data.

The flight performance page 600 also may have a log feedback activator 608, that may be in the form of a virtual button (here stating "give feedback") that when activated by the user, also opens the log feedback page 700 (FIG. 7) for the selected flight, and here specifically for feedback related to the fuel efficiency when that is the only priority being analyzed. Otherwise a choice of log feedback pages may be provided each with a different protocol or mix of protocols, or a single log feedback page may have feedback requests for all selected protocols. The activation may occur by the user pressing the activator by touch or cursor and click as described above.

Referring to FIG. 7, process 300 may include "receive activation to provide user feedback" 318 when the log feedback activator 608 is activated and received by the log forms unit 228. This triggers process 300 to include "open synced feedback log page" 320. In this case, when a synced flight is selected, an example log feedback page 700 may be open. Thus, log feedback page 700 includes the synced flight information (here being flight BLR to CDG) and accompanying information as described above.

Referring to FIG. 8, and alternatively, process 300 may include "receive selection of manual flight entry" 322, where the main debriefing page 500 has an activator 510 when a user desires to enter data into a flight that is not synced with the flight tracking unit 159 and is not listed on the debriefing page 500. Thus, if a flight of a pilot is not listed, the pilot can activate the manual activator 510 that opens a manual log feedback page 800, and process 300 may include "open non-synced feedback log page" 324. The manual log feedback page 800 may have GUI windows, pulldown menus, or other GUI input images to receive flight data from the user or pilot, such as a departure airport menu, an arrival airport menu, a date menu, an aircraft type menu, and a flight number menu. Whether before or after the feedback information is input by the user, process 300 may include "receive non-synced flight data" 326 and this flight data may be transmitted to the flight tracking unit 159 or other local or remote similar unit for process 300 to include "sync entered flight ID data" 328 thereby listing and syncing to data of the manually entered flight, and the transmission of the flight ID data may be initiated or performed at the FB display device 104 by the feedback flight sync unit 220.

Process 300 may include "display flight plan priority questions" 330, where in either case of originally synced or non-synced flight data, log feedback page 700 or 800 shows a set or list 702 or 802 of feedback requests (or questions) that are relevant to particular situations and the set or selected flight plan priority (or aircraft protocol), here being for fuel efficiency. In this case, the questions are shown to be the same on log feedback pages 700 and 800 but may be different. For fuel efficiency, example questions/requests may include "Was a GPU available at the departure airport?", "Was ice present on the runway?", Was a GPU available at the arrival airport?", "Select list of obstacles is any interfered with performing an engine out taxi out", "Was the information listed in the detailed briefing page correct and sufficient?". Note that the question and requests for information are referred to herein interchangeably regardless of the exact form of the request or question.

A request for feedback information may have a pull-down menu of predetermined answers that a pilot can select, or the pilot can choose to input their own answer in a space provided. Other or more questions or requests than these may be provided on the log feedback pages 700 and 800, and this may be repeated for each flight plan priority or protocol being implemented. Each protocol may have a separate page or the questions for multiple protocols may be intermixed. For the non-synced flight on manual log feedback page 800, more general questions may be added when appropriate and depending on the flight operation and conditions of the flight not listed on the main debriefing page. The list of requests may be much longer and more extensive to cover many of the situations a pilot may encounter while using a particular protocol. By some forms, the list of requests for feedback information may be further customized depending on the aircraft location and route, detected or sensed environment of the aircraft during the flight, detected or sensed state of the aircraft or components thereof during the flight, known, detected, or sensed state of the aircrew on the flight, and so forth. By one form, any request relevant to a protocol may be listed. This may include requests as to why or why not a certain flight operation was not performed, whether the aircrew knew of a malfunction of equipment or components on the aircraft or of an operation of one of the avionics systems on the aircraft, such as the FMS, and so forth.

By another form, answering a request on the list 702 or 802 of log feedback pages 700 or 800 in a certain way, may cause more related questions to be visible asking for more details. Thus, if a pilot answers yes as to whether climate affected the time of a taxi, then a window may open displaying further requests for details, such as the exact location at an airport, approximate length of the delay, distance traveled during the delay, control settings that affect fuel efficiency during the delay, the type of weather, and so forth.

As an alternative for any of the log feedback pages, a space may be provided for the pilot to enter any notes the pilot desires to add whether to explain answers to the requests or to add information about an aircraft or flight situation that was not addressed by the requests.

Process 300 may include "receive feedback information from user on the display device" 332, where the FB display device receives the feedback information from a user reading the feedback requests on the display device 104 and entering feedback information onto the log feedback pages described above and whether by using touch screens, virtual or real keyboards, mouse and cursor, and so forth on the FB display device and while using the log feedback pages.

Process 300 may include "transmit feedback answers to flight operation assessment system" 334, where the feedback information along with flight identification may be transmitted to remote system 106 to provide the feedback information data to pilot feedback unit 166 of the flight operation assessment unit 162.

Figure 9:
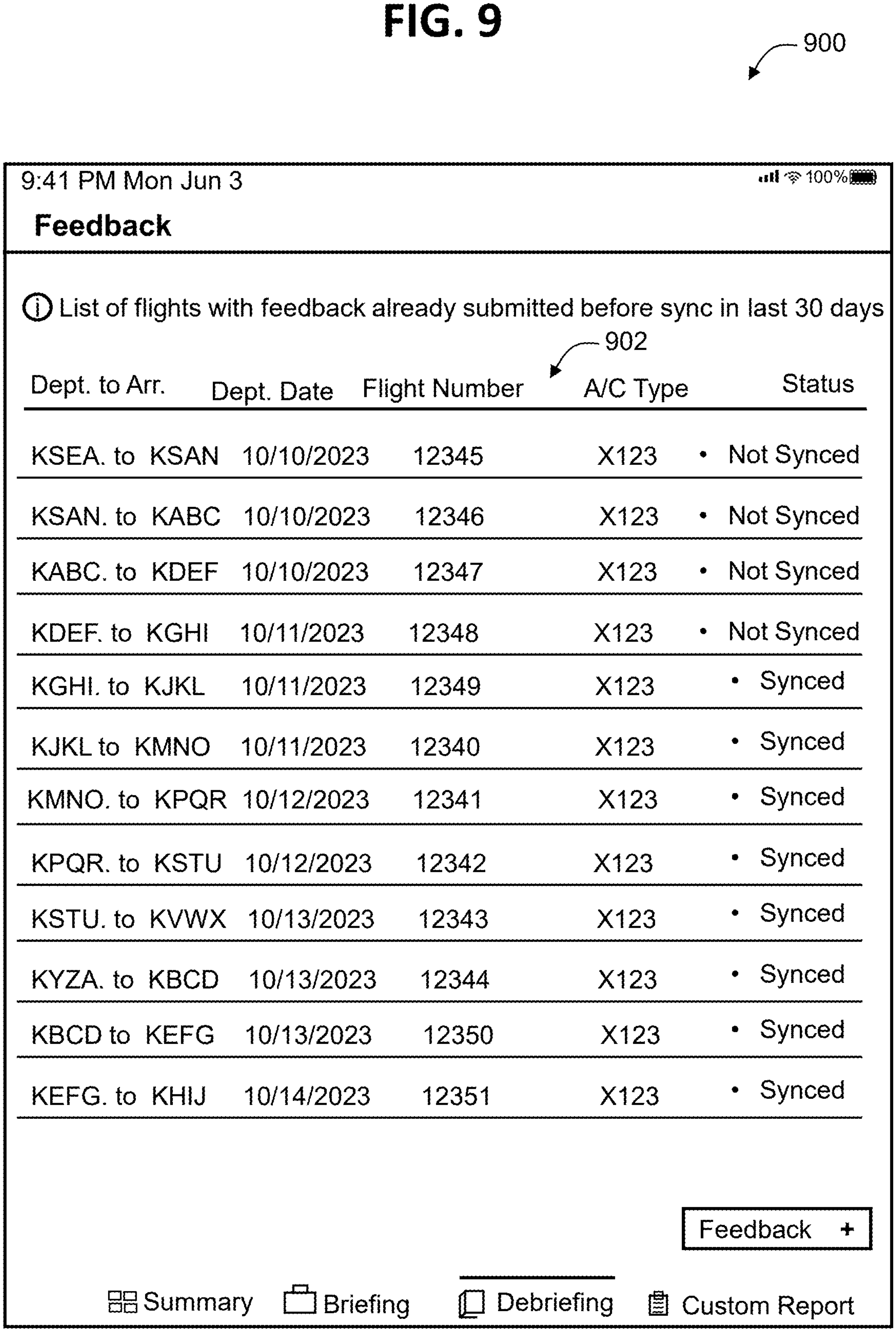
FIG. 9 is a schematic diagram of yet a further example feedback page of the pilot feedback system to display to a user according to at least one of the implementations described herein.

Referring to FIG. 9, process 300 may include "set indicator that feedback was already provided for flight for priority category" 336, and here feedback flight sync unit 220 sets the manual flight as synced in addition to confirming feedback is received by the display device 104 once these tasks are completed. This data may be held in a local flight tracking database on the FB display device 104 or other locations. The feedback flight sync unit 220 also may initiate a display so that process 300 may include "show list of flights with feedback provided and sync status" 338. Thus, a feedback flight list page 900 (or just feedback page) also may be provided to list both recent flights a pilot already provided feedback as well as flights that have not received feedback from the pilot yet or are still awaiting to be downloaded to the remote system 106 so that in either of these cases, the feedback page 900 shows a list 902 of flights where some flights are listed as "Not synced" (at least as of yet). The list 902 may list all other flights as synced where a user already submitted feedback information, and the feedback information was transmitted to the remote system 106. The list 902 recites the flight departure and arrival locations, date, flight number, aircraft type for each flight as well. Other arrangements with a feedback list of more or different flight information may be made as desired.

Referring now to FIG. 4, a process 400 for flight operation assessment using pilot feedback is described according to at least one of the implementations herein. The process 400 includes operations 402 to 424, generally numbered evenly. Systems, device, modules, units, and display page images of any of FIGS. 1-2 and 4A-9 may be referred to describe process 400, where relevant.

Preliminarily, aircraft protocols to be followed by the pilot and avionics systems are either provided (or transmitted or broadcast) to the aircraft or are stored at a remote location accessible to the aircraft avionics systems or pilot to be retrieved whenever needed. Then, the pilots and avionics systems (such as the FMS) can generate flight plans with flight operations that comply with the protocols. Thus, process 400 may include "obtain flight plan priority data"402 and collected by a priority data unit 172. For the fuel efficiency protocol example used above with process 300, this may involve fuel efficiency data providing fuel consumption rates or loads in particular situations and due to particular flight operation variations, such as one airspeed consuming fuel at one rate versus the fuel consumption at another rate while performing the exact same maneuver for a particular aircraft type, and so forth. This may be repeated for a variety of different types of metrics for the same particular flight plan priority (or aircraft protocol), and repeated for each different flight plan priority or protocol.

Once the desired priority data is collected, process 400 may include "generate priority protocols to be used to generate priority flight plans at the aircraft" 404. This may include setting overall efficiency targets as well as setting goals for specific situations such as a taxi in or out, reduced engine on takeoff, and so forth mentioned above for fuel efficiency. This also may involve many different systems and entities, such as any of the avionics regulatory agencies or broadcast entities that broadcast information for aircraft, such as ATCs, and so forth. While the fuel efficiency details are provided above, details of other flight plan priorities (or aircraft protocols) are as follows. It should be noted that a number of the protocols may have overlapping goals.

Flight path airspace constraint protocols prioritize avoidance of restricted areas such as military zones, other airspace restriction zones, terrain restrictions and so forth. Such protocols may provide flight planning limitations that avoid these areas while providing a path with the most fuel efficient or greatest reduction in emissions possible but as a secondary consideration. Such protocols may provide the criteria for deciding when and how to sacrifice fuel efficiency for example due to the constraints.

Severe weather protocols avoid thunderstorms, turbulence, or icing conditions for example that can force pilots to deviate from planned routes, increasing fuel burn and causing delays. The protocols may indicate the criteria for when such deviations should take place.

Air traffic protocols attempt to avoid holding patterns or extended flight times due to congestion. Such protocols may include flight plan limitations (like flying slower in certain situations) to avoid the air traffic congestion.

Time efficiency protocols may provide operating procedure guidelines to better balance the need for time-efficient operations with fuel efficiency and safety for example. This may include having an aircraft in a certain engine control state while awaiting takeoff for quick and efficient change to an acceleration mode for one example.

A regulatory protocol may provide guidelines for situations when a pilot encounters a regulatory requirement, such as mandatory altitude restrictions or speed limits in specific airspaces, and that conflict with operational efficiency.

A passenger comfort and safety protocol may include guidelines for maximization of passenger comfort and safety during turbulence, cabin de-pressurization, temperature control, and so forth, as well as entertainment system settings, etc.

A cost efficiency protocol may provide flight planning limitations for certain situations such as single-engine taxiing, climb, or descent to allow for more fuel-efficient plans. The cost efficiency may otherwise relate to anything associated with the aircraft and cost reduction other than flight planning.

A cargo protocol for cargo aircraft may provide detailed instructions for arranging and positioning cargo in the aircraft to reduce or avoid unnecessary trim adjustments to reduce drag and fuel consumption as one example.

Optionally, once the protocols are generated, process 400 may include "transmit protocols to avionics systems at aircraft" 406 and for use by the pilots and avionics systems to implement flight plans and any generate plans for, and/or perform, flight operations related to the protocols. As mentioned, the protocols may be stored at a remote location and simply made accessible to pilots and aircraft to be retrieved as needed instead.

Now during or after a flight using one or more of the generated protocols, process 400 may include "receive actual flight operation data of at least one flight" 408, and received from the aircraft and by the aircraft data unit 152 where the data of the flight plan is provided to the flight plan unit 154 and data of the state of the aircraft during the flight is provided to the actual flight unit 156. This includes the position and condition of the aircraft and the monitored components of the aircraft during the flight as well as the control settings whether automatic settings by an autopilot or autothrust, or settings by the aircrew and those settings relevant to any of the protocols being used during the flight of the aircraft.

This operation also includes collecting data or information from external sources by the external data unit 158, and this may or may not be information that was known by the crew or avionics systems on the aircraft. Thus, this may include a pressure reading broadcast for the arrival airport of the aircraft and that may not have been known on the aircraft, but should have been used to set an altitude on the aircraft as one example.

Process 400 may include "determine flight plan priority goals according to latest protocols" 410, and this may be performed by the performance analysis unit 160. The performance analysis unit 160 determines the performance targets and other protocol data that should have been or was used on the aircraft. Thus, the identification of the flight is looked up in the flight tracking unit 159, and a database of the flight tracking unit 159 may list which protocols are used on a flight. This may relate to any of the protocols mentioned above.

The performance analysis unit 160 then uses the collected actual flight operation data to determine actual performance metrics (such as fuel consumption, emission level, and so forth), and whether for overall performance or performance during specific situations (such as taxi in or out for example). Process 400 then may include "transmit performance display data to feedback display device" 412, and to display the performance metrics on the flight performance feedback page, such as page 600, at the FB display device 104 when desired as one example.

Thereafter, process 400 may include "transmit feedback requests" 414, and to transmit the feedback requests to the FB display device 104 to display the requests on the log feedback pages 700 or 800. The pilot feedback unit 166 may predetermine the requests for each or individual protocol. Example fuel efficiency feedback requests are already mentioned for log feedback page 700. Example waste emission reduction protocol requests may include requests for information as to why a certain procedure or flight operation was or was not performed when such action is known to reduce emissions, and so forth.

In detail for a constraints protocol, and where constraints may cause flights to have a longer duration and be less efficient particularly with fuel consumption and emissions, feedback from a pilot may permit better flight planning that can integrate more flexible airspace management, allowing protocols to permit pilots to request direct routes or reroutes to avoid congested or restricted areas at least during certain time periods.

As to the weather protocol, pilots can report how weather patterns impact certain routes and how current protocols may not account for such deviations. Flight protocols then can be adjusted to include better integration of real-time weather data, with more flexibility for pilots to choose alternative paths earlier in the flight to avoid adverse weather.

For air traffic protocols, pilots can report inefficiencies caused by congestion or suggest improvements based on specific air traffic control interactions. Based on this pilot feedback, air traffic management can determine when to introduce more advanced traffic flow management tools, such as time-based metering or airspace segmentation and to adjust the protocols accordingly. This would allow pilots to operate more efficiently by minimizing holding times, optimizing entry into busy airspaces, or staggering arrivals and departures to reduce bottlenecks.

For a time efficiency protocol, feedback from pilots on where time inefficiencies occur, such as during ground operations or delays in takeoff and landing, can highlight areas where improvements are needed. Then, time efficiency protocols can be adapted to streamline operations, particularly during boarding, taxiing, and approach phases. For example, earlier clearances for departure or approach could be granted to avoid delays, and more precise scheduling for ground services like refueling or cargo loading could be implemented to minimize turnaround times.

A regulatory protocol with regulations that do not align with current conditions can be modified based on pilot feedback. The feedback from pilots can help regulators revisit certain operational restrictions, allowing for more flexible altitude or speed adjustments based on real-time conditions. For example, regulators could consider allowing deviations from set speed restrictions when fuel savings are significant, while still maintaining safety margins.

As to a passenger comfort and safety protocol, pilots can provide real-time feedback on the causes of discomfort, such as specific altitude bands prone to turbulence or temperature changes due to aircraft design. The feedback from the pilot can lead to better cabin temperature control guidelines, adjustments to turbulence avoidance protocols (such as proactively flying at altitudes with less turbulence), or more adaptive descent and climb procedures to minimize discomfort during pressurization changes. The pilot feedback also can be used by airlines to change aircraft scheduling to avoid specific routes or times when turbulence is more likely.

As to a cost efficiency protocol, pilots may identify unnecessary fuel consumption or delays caused by operational inefficiencies, such as excess taxi times, extended holding patterns, or inefficient routing. Reporting such inefficiencies can help reduce operational costs. The feedback from the pilot can be used to adjust operational protocols to reduce fuel consumption, for example, by optimizing ground operations (like single-engine taxiing) or allowing more fuel-efficient climb and descent profiles. Cost efficiency can also be improved, based on pilot input, by using more precise flight planning systems that integrate pilot-reported inefficiencies.

A cargo protocol may have pilots providing feedback on how the positioning of cargo impacts the aircraft's center of gravity, which affects fuel efficiency and flight dynamics. This can be used to reduce unnecessary trim adjustments. Specifically, cargo loading protocols can be adapted to account for better weight distribution, ensuring a more efficient center of gravity for every flight. The feedback from the pilot can be used to improve ground staff training or enhance cargo loading software to better balance the aircraft, reducing the need for mid-flight adjustments and improving fuel efficiency.

Many other protocols may be used as well.

These protocols, when informed by real-time feedback from pilots, can be made more adaptable to specific conditions depending on the protocol mentioned above, or others not mentioned here. In this way, the protocol modifications based on feedback enhance both operational efficiency and environmental sustainability while maintaining safety and comfort thereby improving the technology of the aircraft itself.

As another alternative, the requests for feedback information may be determined on the fly before transmitting the requests to the FB display device 104. This may be accomplished when the pilot feedback unit 166 has the ability to analyze a detected aircraft situation and create the requests relevant to the detected situation. This may be performed by using machine learning including neural networks that receive situation data and output a request for information. Such a neural network may be trained on a world of known aircraft situations and variations of those situations. For example, data mapping a flight plan that avoids an airspace may be entered into a neural network as input along with a definition of the airspace constraint. The neural network may find a fuel efficient route and provide a request to ask the pilot why the fuel efficient route was not used. Many different examples are possible.

After the requests for feedback information are displayed on the FB display device 104, process 400 may include "receive feedback data from at least one aircraft" 416, and as provided by a pilot or user.

Process 400 may include "determine whether flight achieved flight plan priority goal"418, and this may be determined by the differencing unit 164. The differencing unit 164 compares the actual performance of the aircraft generated by the performance analysis unit 160 and compares it to the target or expected performance. When a difference in performance values is sufficiently significant, then the feedback may be used to determine a solution. The difference in performance data may be compared to a threshold or other criteria determined by experimentation to determine when performance differences are sufficiently large to warrant further analysis with feedback.

Process 400 may include "when goals not reached, determine whether feedback explains underperformance" 420, and now when a sufficiently large difference in performance exists, the feedback is analyzed to determine whether it explains why the difference in performance values occurred. For example, weather or traffic may have delayed an aircraft causing unexpected fuel consumption over the protocol's target fuel consumption values.

Process 400 may include "modify protocols using the feedback explanations" 422. This can be performed as a manual option or an automatic option. For the manual option, the FP protocol/DB unit 170 collects the feedback, protocol, performance, and implemented flight operation data that may be used to decide as to whether and how to update a protocol. This data may be placed on the display 180 in a convenient manner and may be accessible and viewable to a user. The user may analyze the available data and determine whether a protocol should be updated to add an aircraft situation indicated by the feedback information, and then if the protocol is to be updated, which flight operations are to be assigned to the new situation. This may involve a single user, approval committees, groups, airline flight operation (FlightOps) base, dispatch teams, or other entities. The approved updated protocol then may be provided to the FP protocol/DB unit 170 for storage and/or transmission to aircraft.

Otherwise for the automatic option, once the feedback information is collected, the FP protocol/DB unit 170 may automatically analyze the feedback and situation that caused the underperformance and determines whether a protocol should be added or modified. If so, the FP protocol/DB unit 170 generates the addition or modification. This may include adding a description of a situation or conditions (here being an aircraft situation) to the protocol as well as providing corresponding flight operations (whether flight planning, control settings, or any other action or inaction on the aircraft) that should be performed for the new situation or conditions being added to a protocol. These tasks may be performed automatically, such as by using a neural network or other machine learning model or algorithm for example. Such a neural network may be trained to receive input such as feedback information, protocol performance goals and protocol flight operations that should have been implemented, implemented flight operations, flight plans, and existing conditions of the aircraft and environment around the aircraft during a flight. The neural network may be trained to recognize situations (or conditions), most realistic protocol modifications, and/or flight operations (or instructions), that should be implemented in the case of the new situation. In some cases, a protocol guideline may be added to a new protocol situation generalized from specific flight operations that should be taken. Such modified or new protocol may be referred to as a standard operating procedure (SOP). The updated (or modified) or new protocol then may be transmitted to the aircraft or made available to the aircraft or pilot. This may include transmission to a targeted aircraft, such as the ownship aircraft of the pilot entering feedback when such customization is appropriate, or to a fleet of aircraft when the updated protocol is applicable to such a fleet.

When the updated protocol is generated automatically, further automatic or manual tasks still may be used to confirm or approve the updated protocol, such as providing an authorization or approval screen on the display 180 for receiving a manual authorization.

Process 400 may include "grade pilot factoring the feedback" 424, where grading of a pilot may occur as per usual procedures. However, when an underperformance issue arises, such a grading system or unit 174 then may review the feedback data, or flag the feedback data for a user to review manually, to see if an explanation exists as to the underperformance. If so, the pilot grading unit 174 (and/or user) then may look up a list of acceptable explanations to determine if a demerit is to be omitted or not. If a predetermined explanation does not exist on the list, a report to the pilot for further explanation may be transmitted and/or a pilot's supervisor may be notified to obtain further clarification to finalize or omit a demerit.

Overall, a feedback loop between pilots and the remote system 106 (which may be regulatory or operational bodies) can ensure that protocols are not only based on theoretical models but also incorporate real-world practicalities based on realistic historical situations. By addressing specific issues like ATC-imposed constraints or adverse weather conditions, flight protocols can be made more flexible, realistic, and effective, leading to a better balance between operational efficiency, fuel savings, and reduced emissions for example.

Those of skill in the art will appreciate that the various illustrative logical blocks, modules, circuits, and algorithm operations described in connection with the implementations disclosed herein may be implemented as electronic hardware, firmware, computer software, or combinations of both. Some of the implementations and implementations are described above in terms of functional and/or logical block components (or modules) and various processing operations. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and operations have been described above generally in terms of their functionality. Whether such functionality is implemented as hardware, firmware, or software depends upon the particular application and design constraints imposed on the overall system. Skilled artisans may implement the described functionality in varying ways for each particular application, but such implementation decisions should not be interpreted as causing a departure from the scope of the present invention. For example, an implementation of a system or a component may employ various integrated circuit components, e.g., memory elements, digital signal processing elements, logic elements, look-up tables, or the like, which may conduct a variety of functions under the control of one or more microprocessors or other control devices. In addition, those skilled in the art will appreciate that implementations described herein are merely exemplary implementations.

The subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can conduct the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an implementation of a system or a component may employ various integrated circuit components, e.g., memory elements, digital signal processing elements, logic elements, look-up tables, or the like, which may conduct a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" or "units" in order to particularly emphasize their implementation independence. For example, functionality referred to herein as a module or unit may be implemented wholly, or partially, as a hardware circuit comprising custom VLSI circuits or gate arrays, off-the-shelf semiconductors such as logic chips, transistors, or other discrete components as described above. A module may also be implemented in programmable hardware devices such as field programmable gate arrays, programmable array logic, programmable logic devices, or the like. Modules or units may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process operations must be performed in a temporal or logical order according to such sequence unless it is specifically defined by the language of the claim. The process operations may be interchanged in any order without departing from the scope of the invention as long as such an interchange does not contradict the claim language and is not logically nonsensical.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an implementation of the depicted subject matter. In addition, certain terminology may also be used herein for the purpose of reference only, and thus are not intended to be limiting.

While at least one exemplary implementation has been presented in the foregoing detailed description of the invention, it should be appreciated that a vast number of variations exist. It should also be appreciated that the exemplary implementation or exemplary implementations are only examples, and are not intended to limit the scope, applicability, or configuration of the invention in any way. Rather, the foregoing detailed description will provide those skilled in the art with a convenient road map for implementing an exemplary implementation of the invention. It being understood that various changes may be made in the function and arrangement of elements described in an exemplary implementation without departing from the scope of the invention as set forth in the appended claims.

What is claimed is:

1. A method comprising:

receiving, by at least one processor, aircraft data from an aircraft system or sensors on an aircraft and associated with at least one journey of the aircraft and indicating at least one implemented aircraft operation performed during the at least one journey, wherein the aircraft data includes actual flight operation data indicative of actual aircraft performance values for at least one aircraft operation performed during the at least one journey;

receiving, by the at least one processor, an aircraft protocol from a database arranged to be used to determine at least one protocol aircraft operation of the at least one journey, wherein the aircraft protocol is arranged to be used by an aircraft system to maintain at least one flight plan priority goal for the at least one journey;

automatically detecting, by the at least one processor, one or more differences between the at least one implemented aircraft operation and the protocol aircraft operation by comparing the actual aircraft performance values with one or more target aircraft performance values or flight plan priority goals defined by the vehicle protocol;

receiving, by the at least one processor, feedback data explaining the one or more differences, wherein receiving the feedback data comprises obtaining feedback information by receiving data of at least one feedback page with requests for the feedback information displayed on a display device, wherein the requests each being selected to be automatically placed on the feedback page based on the flight plan priority goal of the aircraft protocol and the one or more differences between the actual aircraft performance values and the one or more target aircraft performance values or the flight plan priority goals;

automatically generating at least one modified aircraft protocol comprising adding data of a situation associated with the feedback information to a set of available situations and available to the aircraft by adding the situation identified from the feedback data to a flight planning database holding the available situations and to form the modified aircraft protocol; and wherein the at least one processor provides data for the at least one feedback page to comprise a first feedback page with a list of journeys to be selected to provide feedback and a GUI to identify a journey not on the journey list, a second feedback page that lists journeys already having previously generated feedback information synced to a remote aircraft operation system and journeys without feedback information synced to the remote aircraft operation system, and a third feedback page that is a log feedback page to receive feedback information for a selected journey.

2. The method of claim 1, wherein the differences are differences in results between the use of the at least one implemented aircraft operation and the protocol aircraft operation, wherein the results are associated with the aircraft protocol.

3. The method of claim 1, wherein the differences are differences in performance of the aircraft between the use of the at least one implemented aircraft operation and the protocol aircraft operation, wherein the performances are associated with the aircraft protocol.

4. The method of claim 1, wherein the generating of the at least one modified vehicle protocol is performed automatically by at least one processor.

5. The method of claim 4, wherein the generating of the at least one modified aircraft protocol comprises using a neural network receiving at least a version of the feedback information as input and outputs a version of at least one protocol aircraft operation to be used at the aircraft in a situation associated with the feedback information.

6. The method of claim 1, comprising displaying at least the feedback data on a display in an arrangement so that a user can manually modify an aircraft protocol.

7. The method of claim 1, comprising:

receiving, by at least one processor, an activation request;

in response to the activation request, determining which feedback pages to display to the user on the display device;

displaying at least one of the feedback pages each having one or more of the requests for the feedback information; and obtaining the feedback information from the user and on the at least one feedback page.

8. The method of claim 7, wherein the feedback information is related to user actions, inactions, or observations occurring during the planning of the at least one journey or during the at least one journey.

9. The method of claim 1, wherein the feedback page includes inquiries into a single type of aircraft protocol.

10. The method of claim 9, wherein available aircraft protocols are at least one of: fuel efficiency, reduction of harmful emissions, flight path airspace constraints, severe weather avoidance, air traffic, time efficiency, regulatory requirements, passenger comfort, cost efficiency, or cargo positioning.

11. The method of claim 1, wherein the at least one feedback page includes inquiries into multiple types of aircraft protocols.

12. A display device, comprising:

at least one display screen to display at least feedback-related images;

memory to store data related to at least one journey of at least one aircraft and associated with a user of the aircraft, wherein the data includes actual flight operation data indicative of actual aircraft performance values for at least one aircraft operation performed during the at least one journey; and processor circuitry forming at least one first processor communicatively coupled to the memory, and being arranged to operate by:

displaying a set of journeys associated with the user on the display screen;

receiving a selection of at least one journey of the set of journeys;

displaying requests for feedback information on at least one feedback page on the display screen and associated with at least one aircraft protocol arranged to be used by an aircraft system to maintain at least one flight plan priority goal, wherein the at least one feedback page is arranged to be used to determine protocol aircraft operations of the journey, wherein the requests each being selected to be placed on the at least one feedback page based on the flight plan priority goal and one or more differences between the actual aircraft performance values and one or more target aircraft performance values or the flight plan priority goals;

receiving the feedback information from the user by using the feedback page and transmitting the feedback information to at least one remote second processor that performs updating of aircraft protocols depending on the feedback information, wherein the remote second processor is arranged to operate by:

automatically detecting one or more differences between at least one implemented aircraft operation of the selected journey and at least one of the protocol aircraft operations associated with the selected journey by comparing the actual performance values with the one or more target aircraft performance values or flight plan priority goals, determining whether the feedback information explains the one or more differences, and using the feedback information to generate at least one modified aircraft protocol comprising automatically adding a situation associated with the feedback information to a set of available situations each with a different protocol aircraft operation and by adding the situation identified from the feedback data to a flight planning database holding the available situations and to form the modified aircraft protocol; and controlling the display device, by the at least one first processor, to display the at least one feedback page as having a first feedback page with a list of journeys to be selected to provide feedback and a GUI to identify a journey not on the journey list, a second feedback page that lists journeys already having previously generated feedback information synced to a remote aircraft operation system and journeys without feedback information synced to the remote aircraft operation system, and a third feedback page that is a log feedback page to receive feedback information for a selected journey.

13. The display device of claim 12, wherein the journey is a flight, and wherein the first processor is arranged to operate by displaying a debriefing page on the display screen that shows multiple measured performance metrics associated with a flight planning protocol used on the flight and associated with the requests for the feedback information.

14. The display device of claim 12, wherein the journey is a flight, and wherein the first processor is arranged to operate by displaying a list of flights on the display screen each being communicatively coupled to a flight tracking database that has tracking data indicating a flight plan protocol associated with a listed flight, wherein individual listed flights are selectable to enter the feedback information.

15. The display device of claim 12, wherein the first processor is arranged to operate by displaying multiple selectable aircraft protocols each in a row on a feedback page on the display screen; and wherein the requests for feedback information are associated with the selected aircraft protocols.

16. A system, comprising:

memory storing a first database and a second flight planning database; and processor circuitry forming at least one processor communicatively coupled to the memory, and being arranged to operate by:

receiving aircraft data associated with at least one journey by an aircraft and indicating at least one implemented aircraft operation performed during the at least one journey, wherein the aircraft data includes actual flight operation data indicative of actual aircraft performance values for at least one aircraft operation performed during the at least one journey, receiving an aircraft protocol from the first database and being arranged to be used to determine at least one protocol aircraft operation of the at least one journey, wherein the aircraft protocol being arranged to be used by an aircraft system to maintain at least one flight plan priority goal for the at least one journey, automatically detecting one or more differences between the at least one implemented aircraft operation and the at least one protocol aircraft operation by comparing the actual aircraft performance values with one or more target aircraft performance values or flight plan priority goals defined by the aircraft protocol, receiving feedback data explaining the one or more differences, wherein receiving the feedback data comprises obtaining feedback information by receiving data of at least one feedback page with requests for the feedback information displayed by controlling a display device displaying the feedback page, wherein the requests each being automatically selected to be placed on the at least one feedback page based on the flight plan priority goal of the aircraft protocol and the one or more differences, automatically generating at least one modified aircraft protocol comprising automatically adding an aircraft situation associated with the feedback information to a list of available aircraft situations each with a variation of a protocol aircraft operation by adding the aircraft situation to the second flight planning database holding the available situations and to form the modified aircraft protocol, automatically providing the modified aircraft protocol to be transmitted to automatically input to at least one avionics system onboard the aircraft to be used to automatically set at least one subsequent aircraft operation, and providing data of the at least one feedback page as multiple pages having a first feedback page with a list of journeys to be selected to provide feedback and a GUI to identify a journey not on the journey list, a second feedback page that lists journeys already having previously generated feedback information synced to a remote aircraft operation system and journeys without feedback information synced to the remote aircraft operation system, and a third feedback page that is a log feedback page to receive feedback information for a selected journey.

17. The system of claim 16, wherein the at least one processor is arranged to operate by automatically recognizing a change in protocol aircraft operations to be implemented by using the feedback information and to be assigned to an added aircraft situation.

18. The system of claim 17, wherein the change is associated with an aircraft protocol of at least one of: fuel efficiency, reduced waste emission, airspace constraints, weather avoidance, air traffic, time efficiency, an airline regulation, an air travel standard regulation, airport regulation, passenger comfort, passenger safety, flight cost efficiency, and cargo.

19. The system of claim 16, wherein the processor is arranged to operate by using the feedback information when the one or more differences are greater than a threshold.

* * * * *